(12) United States Patent
Tontiruttananon et al.

(10) Patent No.: US 9,009,316 B2
(45) Date of Patent: Apr. 14, 2015

(54) ON-DEMAND INTEGRATED CAPACITY AND RELIABILITY SERVICE LEVEL AGREEMENT LICENSING

(75) Inventors: Channarong Tontiruttananon, Richardson, TX (US); Kuntaporn Saiyos, Kirkland, WA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 106 days.

(21) Appl. No.: 13/267,165

(22) Filed: Oct. 6, 2011

(65) Prior Publication Data

US 2013/0091282 A1 Apr. 11, 2013

(51) Int. Cl.
G06F 15/173 (2006.01)
G06F 9/50 (2006.01)

(52) U.S. Cl.
CPC ..................... *G06F 9/5061* (2013.01)

(58) Field of Classification Search
CPC ................... H04L 29/08144; H04L 29/08072; H04L 29/06
USPC ..................... 709/223–226; 714/48
See application file for complete search history.

(56) References Cited

U.S. PATENT DOCUMENTS

| 2002/0097680 | A1* | 7/2002 | Liu et al. ........................ 370/238 |
| 2003/0204759 | A1* | 10/2003 | Singh ............................. 713/320 |
| 2005/0071317 | A1* | 3/2005 | Chandrashekhar et al. ...... 707/2 |
| 2007/0064711 | A1* | 3/2007 | Wang et al. ................. 370/395.4 |
| 2009/0094613 | A1* | 4/2009 | Maw et al. ..................... 718/105 |
| 2010/0093318 | A1* | 4/2010 | Zhu et al. ................... 455/414.1 |
| 2010/0125656 | A1* | 5/2010 | Karasaridis et al. .......... 709/224 |
| 2010/0153960 | A1* | 6/2010 | Youn et al. .................... 718/104 |
| 2011/0029981 | A1* | 2/2011 | Jaisinghani ................... 718/104 |
| 2011/0161496 | A1* | 6/2011 | Nicklin ......................... 709/226 |
| 2011/0238857 | A1* | 9/2011 | Certain et al. ................ 709/232 |
| 2012/0102369 | A1* | 4/2012 | Hiltunen et al. ................ 714/48 |

OTHER PUBLICATIONS

Machida, et al. Redundant Virtual Machine Placement for Fault-Tolerant Consolidated Server Clusters. Network Operation and Management Symposium (NOMS) 2010 IEEE. Apr. 19, 2010.

(Continued)

*Primary Examiner* — Chris Parry
*Assistant Examiner* — Weiwei Stiltner

(57) ABSTRACT

A system and method for providing on-demand Integrated capacity and reliability Service Level Agreement (SLA) Software License (ISL). The disclosed approach allows customized purchase of capacity together with the desired reliability SLA at fine granularity of both quantities. The ISL licensing approach can be applied in the distributed Processing Entities (PEs) systems and also in the Virtual Machines (VMs) based cloud computing model. The on-demand ISL licensing approach makes use of an ISL dimensioning methodology (implemented using an ISL Manager) and an ISL Controller (ISLC) that keeps track of the capacity usage at the system level together with the periodic monitoring of health status of PEs or VMs. The ISLC dynamically controls the capacity usage as well as the reliability SLA based on the aggregated workload utilization conditions from all the PEs or VMs, hence allowing the delivery of the user-purchased level of guaranteed reliability SLA in an economical manner.

19 Claims, 15 Drawing Sheets

(56) References Cited

OTHER PUBLICATIONS

Harle, et al. Service Level Agreement Framework for Differentiated Survivability in GMPLS-Based IP-over-Optical Networks. Proceedings of the 2007 IEEE International Conference on Communications (ICC 2007). Jun. 24-28, 2007.

Held, et al. Consideration of Connection Availability Optimization in Optical Networks. Design of Reliable Communication Networks, 2003. Oct. 19, 2003.

* cited by examiner

Capacity Software License
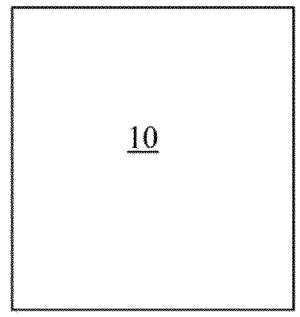
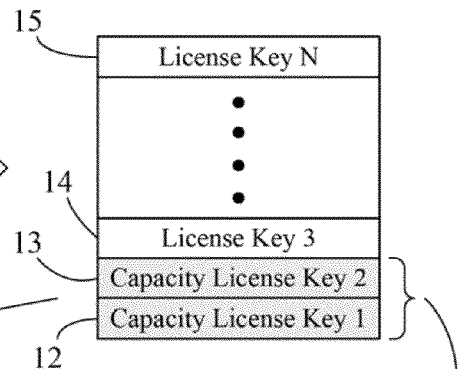
FIG. 1 (PRIOR ART)
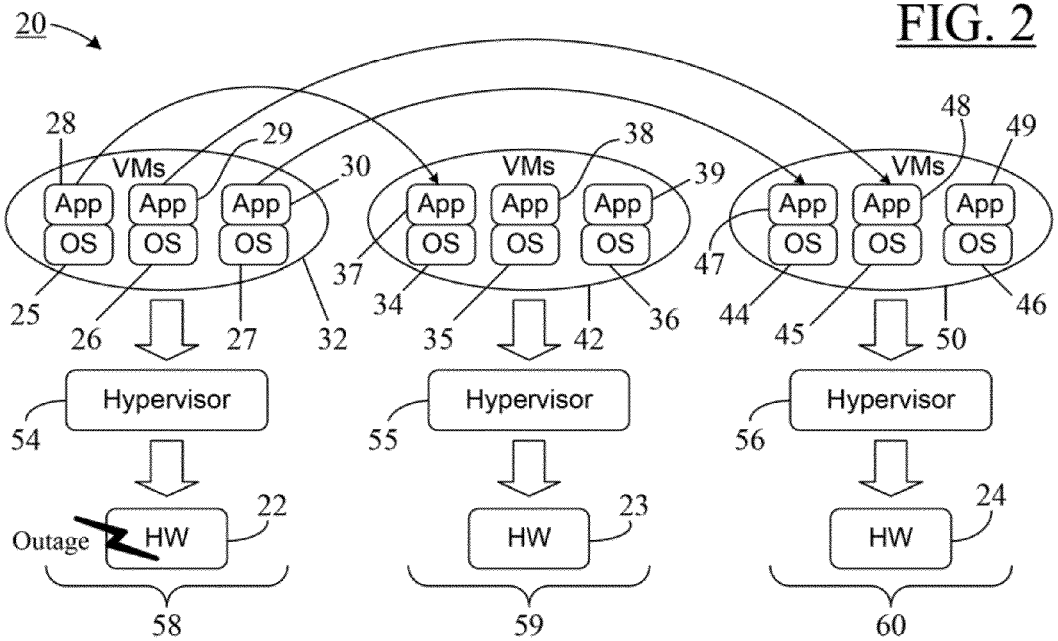
FIG. 2

$PE_i$ has capacity rating of $c_i$
The distributed PEs system has the capacity rating of $C_{system} = N \Sigma c_i$ Note: $e = e^*$ (the optimal enhanced capacity level) when $e$ is the minimum enhanced capacity level sufficient to guarantee reliability SLA $0 < o \leq e \leq 1$

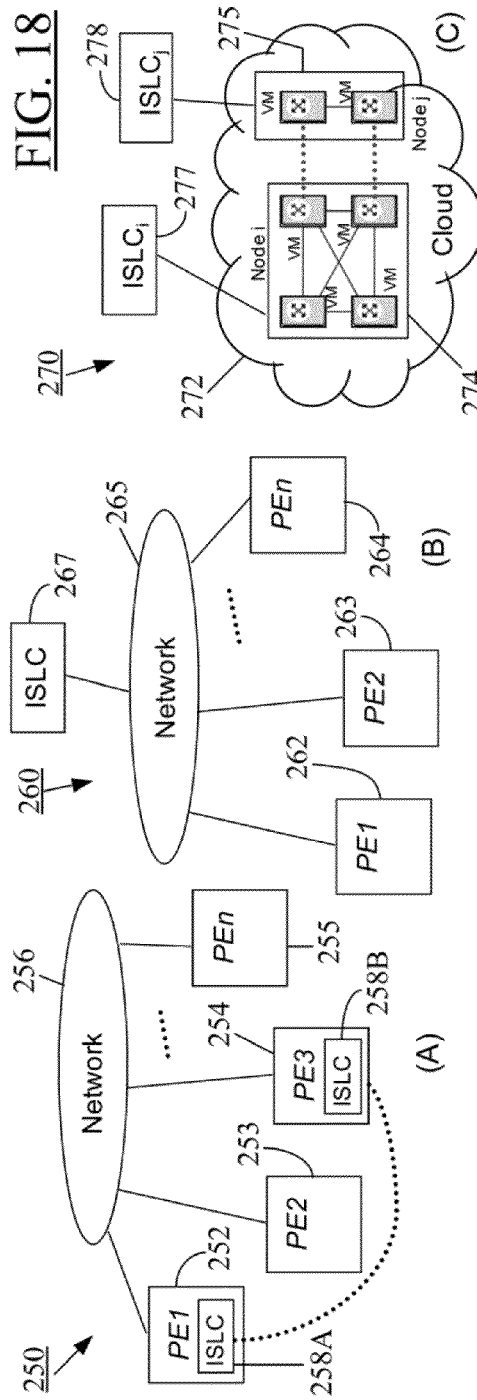

ON-DEMAND INTEGRATED CAPACITY AND RELIABILITY SERVICE LEVEL AGREEMENT LICENSING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to on-demand access to processing capacity of a processing resource. More particularly, and not by way of limitation, the present invention is directed to a system and method for providing an integrated software license for on-demand and scalable processing capacity along with an on-demand and scalable reliability Service Level Agreement (SLA).

Traditionally, on demand access to processing capacity (of a processing resource) can be provided through capacity software licensing as discussed, for example, in U.S. Pat. Nos. 7,146,496 and 7,493,488. In many applications, a computerized system provides a functionality of interest (e.g., accounting computations, customer data record management, call traffic management for a cellular wireless network, etc.) over a number of distributed Processing Entities (or Processing Elements) (PEs). Thus, the capacity of the functionality of the system is provided by a group of capacity-shared PEs in which the PEs may have different capacity ratings, load distribution among the PEs may be imbalanced, and the PEs may or may not be geographically (or physically) co-located with one another. FIG. 1 illustrates an exemplary capacity software (SW) licensing mechanism in which the whole unit (identified by reference numeral "10") of the capacity of primary function of the computerized system is subdivided into chunks of smaller capacity units (some of which are identified by reference numerals "12" through "15") controlled and managed via respective capacity software licenses. A user/customer can purchase any number of capacity software licenses on demand and the system capacity usage is then policed in real time, near real time, or through a regular periodic auditing process to ensure conformance with the number of purchased capacity licenses. For example, in FIG. 1, the customer is shown to have purchased two capacity SW license keys for capacity units 12-13 (illustrated by darkened blocks), but can as well purchase any desired number of software licenses (from license key 1 to license key N) any time on demand up to the system maximum capacity.

In distributed PEs systems (e.g., the Mobile Switching Center (MSC) pool or Serving General Packet Radio Service Support Node (Serving GPRS Support Node or SGSN)/Mobility Management Entity (SGSN/MME) pool systems—collectively called Core Network (CN) pool), the capacity of the functionality of the system may be provided by a group of capacity-shared PEs. The CN pool provides service providers great value on the network level such as, for example, dynamic capacity management, simplified network planning, network resiliency and geographical redundancy. The CN pools may have a "built in" system-level redundant capacity that can be accessed when there is a failure or outage of one or more PEs within the system. According to the current industry practice, the distributed CN pool's spare capacity is engineered using the N+1 redundant capacity level so that the system will not suffer any outages with one PE failure. This level of redundant capacity normally leads to a huge improvement in the CN pool's (or any such distributed PEs system's) reliability level relative to the reliability level of the individual members (e.g., an individual PE) of the CN pool. Usually, the reliability improvement is at a level that far exceeds both the service provider and product supplier reliability targets.

Another way to enable on demand access to capacity is through cloud computing. Cloud computing allows on demand network access (i.e., pay-as-you-go) to a shared pool of configurable computing resources (e.g., networks, servers, storage, applications, and services) providing scalable capacity on demand and a blanket level of guaranteed quality of service (QoS) or reliability Service Level Agreement (SLA). Cloud computing frees cloud users from the costly hardware and software acquisition, installation, and maintenance tasks through the use of simpler hardware that accesses cloud provider's vast network of computing resources (comprising distributed PEs) which share cloud users' workload. The sharing of computing resources reduces the cost to both the cloud user and the cloud provider. As mentioned, cloud provider offerings, such as cloud utility computing, typically include SLAs.

An example of cloud computing may be a telco cloud which tackles the challenges around the Software as a Service (SaaS) aspect of cloud computing by offering a core network and application layer products as SaaS. Products that may be part of such a telco cloud include, e.g., the MSC server, the Internet Protocol (IP) Multimedia Subsystem (IMS) core, the SGSN control plane, and application layer products such as Business Communication Suite (BCS). A telco cloud project may support multiple automated and isolated product deployments (multi-tenancy) on Infrastructure as a Service (IaaS) clouds. These IaaS clouds may be hosted by cloud providers, operators, or other 3rd parties. In cloud computing, individual application layer products such as the MSC server may be migrated to instances of software-based Virtual Machines (VMs) that may be hosted on network of shared hardware infrastructure in the cloud using virtualization technology. Other examples of cloud computing are Amazon Web Services (AWS), Google Application Engine (GAE) for businesses, and Microsoft Azure. Many Tier 1 carriers such as AT&T and Verizon Business also have commercial cloud computing offerings.

As mentioned, cloud computing is a model for enabling network access to a shared pool of resources. Cloud infrastructure may provide resources needed for enabling cloud services. A virtualized environment could be configured such that a hardware failure can fail over to one of a set of backup PEs allowing for many-to-one failover in a virtual environment in the cloud. FIG. 2 depicts how a hardware failure may be handled in a VM-based cloud 20. The cloud 20 may implement virtualization to partition hardware processing resources 22-24 (such as, for example, Central Processing Unit (CPU), memory, storage, and Input/Output (I/O) units) to execute different Operating Systems (OS) and corresponding applications (App) on the same hardware. For example, in FIG. 2, operating systems 25-27 and corresponding applications 28-30 may constitute a set of VMs 32 that is executed on hardware 22, operating systems 34-36 and corresponding applications 37-39 of the VMs 42 may be executed on hardware 23, and operating systems 44-46 and corresponding applications 47-49 of the VMs 50 are executed on hardware 24. In FIG. 2, the VMs 32, 42, 50 may turn hardware into software instances, and hypervisors 54-56 may map corresponding VMs 32, 42, 50 to physical hardware (HW) resources. In FIG. 2, each set of VMs, hypervisor, and related hardware may be considered a Processing Entity (PE) as indicated by reference numerals "58," "59", and "60." It is observed here that in other systems or configurations involving distributed computing/processing, a PE may constitute different elements than those shown in FIG. 2. As illustrated in FIG. 2, when there is a hardware failure in the cloud 20 (e.g., failure of hardware resource 22), the execution of VMs 32 associated with the hardware 22 may be carried over to a set of backup PEs 59-60 such that application 28 in the failed PE 58 may be executed through application 37 in the backup PE 59, and applications 29-30 in the failed PE 58 may be executed through respective applications 47-48 in the backup PE 60.

SUMMARY

Existing capacity software licensing approaches, however, overlook the possibility of offering on-demand access for the differentiated level of reliability SLA in conjunction with the on-demand access for the capacity, especially in distributed PEs system and utility cloud computing where significant value can be created by such an offering. It is observed that the existing capacity software license schemes primarily deal with capacity of the system without regard to the reliability aspect. If reliability SLA is offered, then the offering is inflexible and not user-customizable. For example, at present, there is only one blanket level of reliability SLA offering from cloud providers for any cloud users who may have in fact a variety of different reliability SLA requirements and may want to scale the reliability SLA on demand. As examples of such inflexible approach, it is observed that, at present, the Amazon Elastic Compute Cloud (EC2) SLA commitment is 99.95% availability for each Amazon EC2 Region (as mentioned at http://aws.amazon.com/ec2/on Jun. 13, 2011), the GAE for business's availability SLA is 99.9% monthly uptime (as mentioned at http://www.google.com/apps/intl/en/terms/sla.html on Jun. 13, 2011), Microsoft Azure's monthly SLA is 99.9% availability (as mentioned at http://www.microsoft.com/downloads/en/details.aspx?displaylang=en\%20\&FamilyID=d327 02dd-a85c-464d-b54d-422a23939871 on Jun. 13, 2011), AT&T's utility cloud computing service SLA is 99.9% availability (as mentioned at http://www.business.att.com/enterprise/Family/hosting-services/utility-hosting/ on Jun. 13, 2011) and Verizon's Computing as a Service (CaaS) SLAs is 100% availability of the customer portal and virtual farm (as mentioned at http://www.verizonbusiness.com/us/Products/it/cloud-it/caas/reliability.xml on Jun. 13, 2011).

Thus, existing capacity software licensing approaches may not have the capability that would allow customized purchase of a desired level of system's capacity together with a desired level of reliability service level agreement (SLA). For example, there is no existing approach that would allow the on-demand offering of a software license for purchasing x amount of system capacity with 4.5 9 s (99.995%) availability SLA or y amount of capacity with 2.5 minutes downtime/system/yr SLA, not to mention ensuring the delivery of both the purchased capacity and the reliability SLA.

It is therefore desirable for a software licensing entity (e.g., cloud operators, service providers that offer distributed PEs systems for resource-sharing, product suppliers or vendors offering services based on distributed processing, etc.) to be able to offer on-demand scalable reliability SLA in addition to the on-demand scalable capacity for the sharing of a processing resource (e.g., a CN pool, a telco cloud, a multiple PE-based system, etc.). Virtualization also opens the possibility for the introduction of on-demand scalable reliability SLA in addition to the on demand scalable capacity for carrier service providers running some or all of their network equipments in the managed telco cloud. In case of a distributed PEs system (e.g., a CN pool), the N+1 redundant capacity level allows the creation of an offering of a finer granularity for the distributed PEs system's redundant capacity level in order to deliver a given level of reliability SLA. This may be of great value to both the service provider and the product supplier. For example, one service provider might want to purchase software license for 40% of the deployed CN pool's maximum system capacity at the 0.525 minute downtime per system per year (i.e., six 9's availability) reliability SLA, whereas another service provider might want to purchase 25% of the deployed CN pool's maximum system capacity at the 2.5 minutes downtime per system per year reliability SLA, or the same service provider might want to upgrade the reliability SLA from 2.5 minutes to 1 minute downtime per system per year. In all these cases, the required system spare capacity level may be less than N+1. As mentioned earlier, existing software licensing approaches may not have this capability. Hence, it is desirable to unlock this customizable SW licensing potential and opportunity to maximize network utilization regardless of whether the network uses cloud computing or any other PEs based distributed processing.

The present invention provides a solution to the above-described problem of inflexible reliability SLA offering from current providers of shared processing via pooled or distributed processing resources. In one embodiment, the present invention relates to an Integrated capacity and reliability SLA Software License (ISL) that integrates on-demand and scalable capacity SW license along with on-demand and scalable reliability SLA SW license. A customer can purchase the ISL at any customer-desired level of capacity and customer-desired level of reliability SLA on demand.

In one embodiment, the present invention is directed to a method of providing an Integrated capacity and reliability SLA Software License (ISL) license. The method comprises the steps of: using an ISL manager, receiving an order from a user for a user-requested level of capacity and a user-requested level of reliability SLA for a processing resource that is shared among a plurality of users, wherein both the capacity and the reliability SLA are configured to be on-demand and scalable by each user in the plurality of users; and, using the ISL manager, providing the ISL for the user-requested level of capacity and the user-requested level of reliability SLA for the processing resource.

In another embodiment, the present invention is directed to a system for providing an ISL license. The system comprises an ISL Manager (ISLM); and an ISL Controller (ISLC). The ISLM is configured to perform the following: receive an order from a user for a user-requested level of capacity and a user-requested level of reliability SLA for a processing resource that is shared among a plurality of users, wherein both the capacity and the reliability SLA are configured to be on-demand and scalable by each user in the plurality of users; and provide the ISL for the user-requested level of capacity and the user-requested level of reliability SLA for the processing resource. The ISLC is coupled to the processing resource and in communication with the ISLM. The ISLC is configured to monitor capacity usage of the processing resource to ensure that the user-requested level of capacity of the processing resource is available at the user-requested level of reliability SLA in the order received by the ISLM.

In another embodiment, the present invention is directed to a method of granting and managing an ISL license. The method comprising the steps of: using an ISL manager, receiving an order from a user for a user-requested level of capacity and a user-requested level of reliability SLA for a processing resource that is shared among a plurality of users, wherein both the capacity and the reliability SLA are configured to be on-demand and scalable by each user in the plurality of users; using the ISL manager, determining the number of capacity software licenses needed for the user-requested capacity and an optimal level of spare capacity of the processing resource required to deliver the user-requested reliability SLA at the user-requested level of capacity; using the ISL manager, allocating the ISL to the order when the processing resource is able to support the determined number of capacity software licenses and the optimal level of spare capacity; and, using an ISL controller coupled to the processing resource and in communication with the ISL manager, monitoring capacity usage of the processing resource to ensure that the user-requested level of capacity of the processing resource is available at the user-requested level of reliability SLA for the ISL allocated by the ISL manager.

In another embodiment, the present invention is directed to a communication network node providing a processing resource that is shared among a plurality of users. The communication network node includes a data processing unit configured to provide an ISL license by performing the following: receiving an order from a user for a user-requested level of capacity and a user-requested level of reliability SLA for the processing resource, wherein both the capacity and the reliability SLA are configured to be on-demand and scalable by each user in the plurality of users; and providing the ISL for the user-requested level of capacity and the user-requested level of reliability SLA for the processing resource.

The disclosed on demand integrated capacity and reliability SLA thus provides a mutually efficient way for a service provider (or cloud computing user) and a product supplier (or cloud computing provider) to optimize their capital and operational expenditures. It enables the service provider (or cloud computing user) to plan and time their capital expenditure at any desired levels of purchased capacity and at the desired level of reliability SLA based on their short term capacity and reliability SLA demands. The service provider/cloud computing user can also exploit the ability to rapidly expand the capacity or upgrade reliability SLA through additional purchase of the ISL licenses, at a fine capacity and reliability SLA granularities up to the maximum of the system capacity rating that has been deployed, as the demand grows. Since adding capacity and/or upgrading the reliability SLA mean issuing and turning on the ISL licenses (which can be done automatically and remotely), there may be no need to deploy an installation team to install and test the upgraded software and/or hardware components for every capacity and/or reliability SLA upgrade event. This would lead to significant saving on the operational expenditure for both the service provider(/cloud computing user) and the product supplier (/cloud computing provider), not to mention the added benefit for the product supplier (/cloud computing provider) to secure a strong future sale prospect created by the existence of the least resistance capacity as well as reliability upgrade path. Furthermore, because the present invention addresses user's actual requirements of reliability SLA (as opposed to the earlier-mentioned traditional offering of one blanket level of reliability SLA in a distributed PEs system), the industry practice of provisioning of N+1 redundancy may in fact require a lower level of system spare capacity under the present invention as opposed to when N+1 redundancy is provisioned without regard to the actual user-required reliability SLA (as is traditionally done). As a consequence of the lower level of system spare capacity required based on actual needs of reliability SLA, more capacity software licenses could be made available for purchase without any hardware upgrade, thereby leading to efficient utilization of system resources. In case of cloud computing, the ability to provide a differentiated level of reliability SLA may allow the cloud providers to maximize their cloud computing network utilization and drive down the network cost further.

BRIEF DESCRIPTION OF THE DRAWINGS

In the following section, the invention will be described with reference to exemplary embodiments illustrated in the figures, in which:

FIG. 1 illustrates an exemplary capacity software licensing mechanism in which the whole unit of the capacity of primary function of a computerized system is subdivided into chunks of smaller capacity units controlled and managed via respective capacity software licenses;

FIG. 2 depicts how a hardware failure may be handled in a Virtual Machine-based cloud;

FIG. 18 depicts three exemplary configurations showing how an Integrated capacity and reliability SLA Software License Controller (ISLC) according to the teachings of the present invention may be implemented;

FIG. 19 shows an exemplary ISL Controller according to one embodiment of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that the invention can be implemented to enable any owner/provider of resources for shared computing to more flexibly offer software licenses for customizable resource capacity and reliability SLA.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Figure 3:
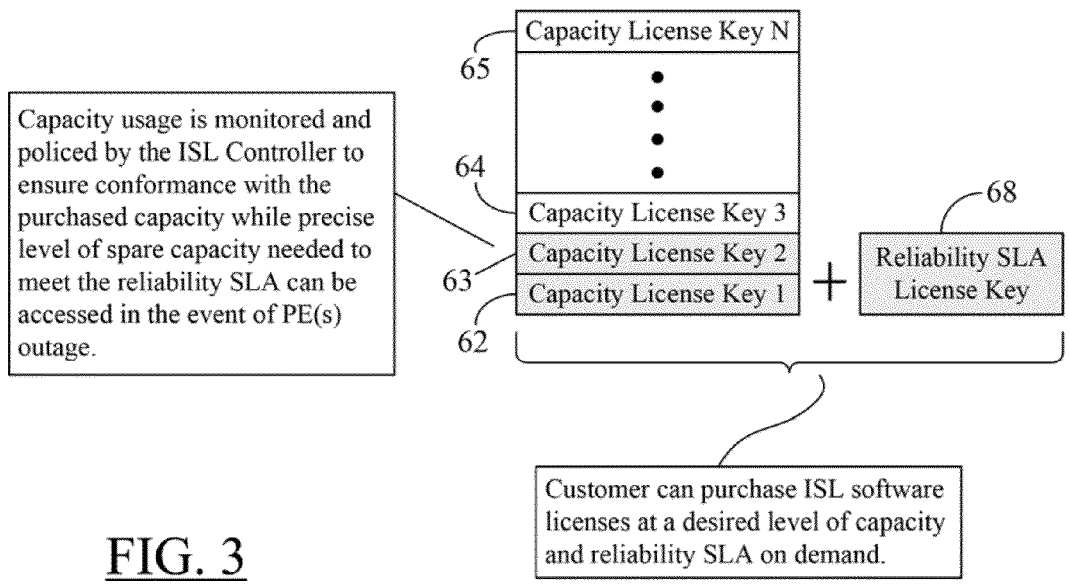
FIG. 3 shows an example of how capacity and reliability SLA software licenses may be customized under the ISL licensing scheme according to one embodiment of the present invention.

FIG. 3 shows an example of how capacity and reliability SLA software licenses may be customized under the ISL licensing scheme according to one embodiment of the present invention. Similar to FIG. 1, the whole unit (not shown for simplicity) of the capacity of primary function of a computerized system or processing resource (not shown) may be subdivided into chunks of smaller capacity units (some of which are identified by reference numerals "62" through "65") controlled and managed via respective capacity software licenses. However, contrary to the arrangement in FIG. 1, the present invention allows a user/customer to purchase any number of ISL software licenses at a desired level of capacity and reliability SLA granularity on demand (e.g., 95.56% monthly uptime for 25% of the deployed system's maximum capacity, or 10.25 minutes of downtime per system per year at 40% of the deployed system's maximum capacity, etc.). Thus, the user can purchase a SW license for user-customized capacity integrated with a SW license for user-customized reliability SLA, up to the maximum capacity rating of the deployed system (or processing resource). In FIG. 3, a user is shown to have purchased an ISL according to the present invention comprising two capacity SW license keys for capacity units 62-63 (illustrated by darkened blocks) and a user-desired reliability SLA license key indicated by another darkened block 68. However, as is understood, the user can as well purchase any other desired number of ISL licenses (from capacity license key 1 to license key N, along with user-desired reliability SLA) on demand up to the system's maximum capacity. In the present invention, usage of the processing resource's capacity may be regularly monitored and policed (in real time, near real time, or through a regular periodic auditing process) by an ISL Controller (not shown in FIG. 3, but shown in FIG. 4 and discussed in more detail below) to ensure conformance with the purchased capacity level under normal operating condition while precise level of spare capacity—needed to meet the requirements of the purchased reliability SLA—can be accessed in the event of PE(s) or VM(s) outage.

Figure 4:
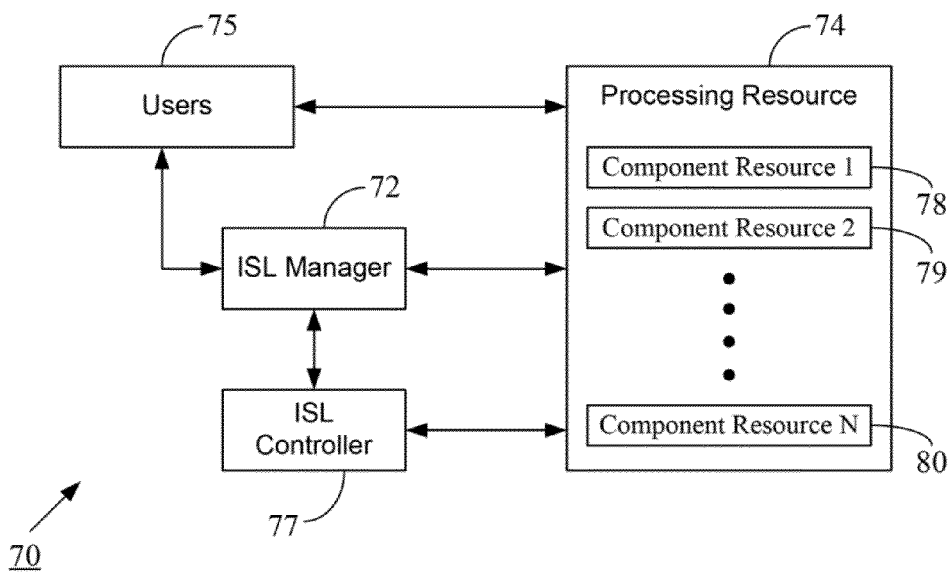
FIG. 4 illustrates an exemplary arrangement to implement the ISL licensing mechanism according to one embodiment of the present invention.

FIG. 4 illustrates an exemplary arrangement 70 to implement the ISL licensing mechanism according to one embodiment of the present invention. In the arrangement 70, an ISL Manager (ISLM) 72 may be coupled to a processing resource 74. The ISLM 72 may allocate ISL software licenses (as per the methodology discussed later with reference to FIG. 8) for the processing resource 74 to users/customers 75 at the user-desired level of capacity and reliability SLA on demand. As part of issuing an ISL, the ISLM may dimension an optimal level of spare capacity e* (of the processing resource 74) required to deliver the desired reliability SLA (e.g., system downtime SLA or system availability SLA) at the desired level of user-purchased capacity. An ISL Controller (ISLC) 77 may be in communication with the ISLM 72 to check if any new (or upgraded) ISL software licenses have been activated by the ISL Manager 72. The ISLC 77 also may be coupled to the processing resource 75 to monitor usage of its capacity as mentioned earlier with respect to FIG. 3. The ISLC 77 may activate the optimal level of spare capacity (dimensioned by the ISLM 72 as mentioned) and make it available for customers' use (through their purchased reliability SLA SW license keys) whenever there is an outage within the processing resource 74. Additional architectural details of the ISLM 72 and the ISLC 77 are provided below with reference to discussion of FIGS. 7 and 19, respectively.

The processing resource 74 may be any computerized system that provides a functionality of interest (e.g., accounting computations, customer data record management, call traffic management for a cellular wireless network, etc.) over a number of distributed component resources (some of which are identified by reference numerals "78" through "80" in FIG. 4). Broadly speaking, a component resource may be simply any portion of the processing resource 74 capable of providing the functionality of the processing resource 74. Thus, the capacity of the functionality of the system 74 may be provided by a group of capacity-shared component resources in which each component resource may have different capacity ratings, load distribution among the component resources may be imbalanced, and the component resources may or may not be geographically (or physically) co-located with one another. Some examples of the processing resource 74 include a distributed PEs system such as a CN pool (including, for example, an MSC pool network, and an SGSN/MME pool network), or a cloud computing entity (e.g., a telco cloud) having a plurality of VM-based PEs, or other communication network node. Thus, the related component resource may be an individual PE (e.g., an MSC and its associated Radio Access Network (RAN) node, an SGSN-MME pair, etc.) in a distributed PEs system or a VM-based cloud PE (e.g., a VM-based PE implementing, for example, MSC server functionality or IMS core functionality) mentioned earlier with reference to FIG. 2. In one embodiment, a component resource may itself be a distributed PEs system or cloud. The users 75 may access the capacity of the processing resource, 74 via appropriate ISL software license keys (which include, as shown in FIG. 3, capacity SW license keys as well as reliability SLA SW license keys) received from the ISLM 72.

It is noted here that each entity shown in FIG. 4 (i.e., users 75, ISLM 72, ISLC 77, etc.) may be connected to the relevant other entity (i.e., in electrical communication with such other entity) via wireline and/or wireless means including, for example, a communication network (not shown). The communication network may include, independently or in combination, any of the present or future wireline or wireless data communication networks, e.g., an Ethernet Local Area Network (LAN), the Internet, the Public Switched Telephone Network (PSTN), a cellular telephone network, a Wide Area Network (WAN), a satellite-based communication link, a Metropolitan Area Network (MAN), and the like. In one embodiment, two or more component resources in the processing resource 74 also may be connected to each other via a communication network (e.g., a network operated, managed, or used by an owner/operator of the component resources).

Prior to discussing functionalities of ISLM 72 and ISLC 77 in more detail, a brief discussion of how a system's reliability SLA can be engineered is provided in the context of a distributed PEs system such as, for example, a CN pool. In a distributed PEs system such as an MSC pool network or an SGSN/MME pool network, a group of Core Network (CN) nodes of MSCs or SGSNs in the same pool area may share, in parallel, traffic generated from various network entities (e.g., an enhanced Node B (or eNodeB), Radio Network Controllers (RNCs), or Base Station Controllers (BSCs)) residing within the same pool area. Similar to other geographically distributed PEs systems, CN pool offers advantages to manage sharp traffic increases and high traffic loads by exploiting the spatial and temporal (e.g., time zone) variation of the traffic characteristic. The CN pool network provides network operators great value on the network level, for example, dynamic capacity management, simplified network planning, network resiliency, and geographical redundancy. An important aspect of distributed PEs system like a CN pool is the possibility to exploit the PE's agnostic view of the workload handled by the system (i.e., any instances of the workload can be handled by any PEs in the system) to engineer a capacity redundancy for the system in order to improve system reliability with respect to the reliability of an individual PE. For example, in a CN pool network, it is an industry practice to provision spare capacity in the CN pool in such a way that if there is a single failure of a CN pool member PE, the remaining PEs in the pool will have sufficient level of spare capacity to handle additional traffic load previously handled by the failed PE. That is, the operational maximum limit with respect to the individual PE capacity rating—i.e., $O_{limit}$, used for normal operation, would have to be specified in such a way that the total amount of traffic handled in the normal busy-hour operation at $O_{limit}$ level by all the PEs in the pool has to be the same as the amount of traffic that could be handled by the PEs in the pool with one less PE, without triggering an overload event. Thus, if there are N PEs in the CN pool, this means that $NO_{limit}=(N-1)$(maximum utilization level at 100% capacity rating of a PE). Thus, $$NO_{limit} = (N-1)(100\%), \text{ or } O_{limit} = \left(1 - \frac{1}{N}\right)(100\%) \quad (1)$$

Figure 15:
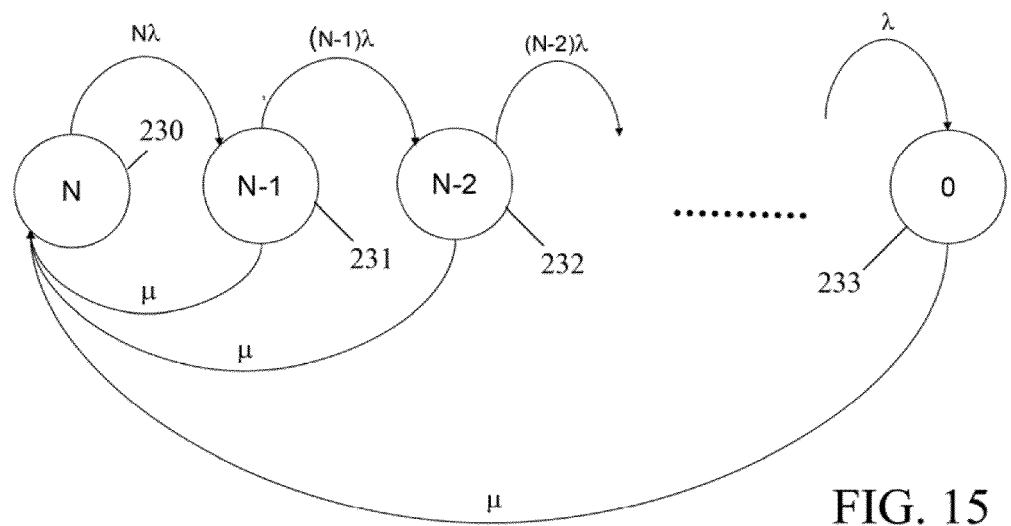
FIG. 15 illustrates Markov states in a system of distributed PEs (or a VM-based cloud) having N subsystems of equal capacity.

For N=3, the above equation (1) implies that $O_{limit}$ should be set at no more than 66.7% of capacity rating of an individual PE in order to avoid potentially triggering an outage event in the CN pool system due to the induced overload traffic-discarding resulting from a PE failure. However, it may be of interest to analyze the precise reliability improvement in term of the system downtime with respect to the PE downtime performance rating. The system downtime can be calculated based on the capacity weighted downtime concept discussed in "TL 9000 Quality Management System (QMS) Measurements Handbook Release 4.5," Jul. 1, 2010, the relevant disclosure of which is incorporated herein by reference. As an example of weighted downtime, it is observed that a partial outage of a subsystem that results in a loss of 20% of the whole system capacity for 30 minutes would translate to capacity weighted downtime of 0.2×30=6 minutes. The weighted downtime concept can be applied in the Markov reliability modeling approach to derive the CN pool system downtime. Utilizing the Markov model for distributed PEs system (as shown in FIG. 15 and discussed below), the CN pooled system downtime can be computed based on the individual PE downtime by setting e=1 and $$o = \frac{O_{limit}}{100}$$

while using the methodology discussed below with reference to FIG. 13 or 14.

Figure 5:
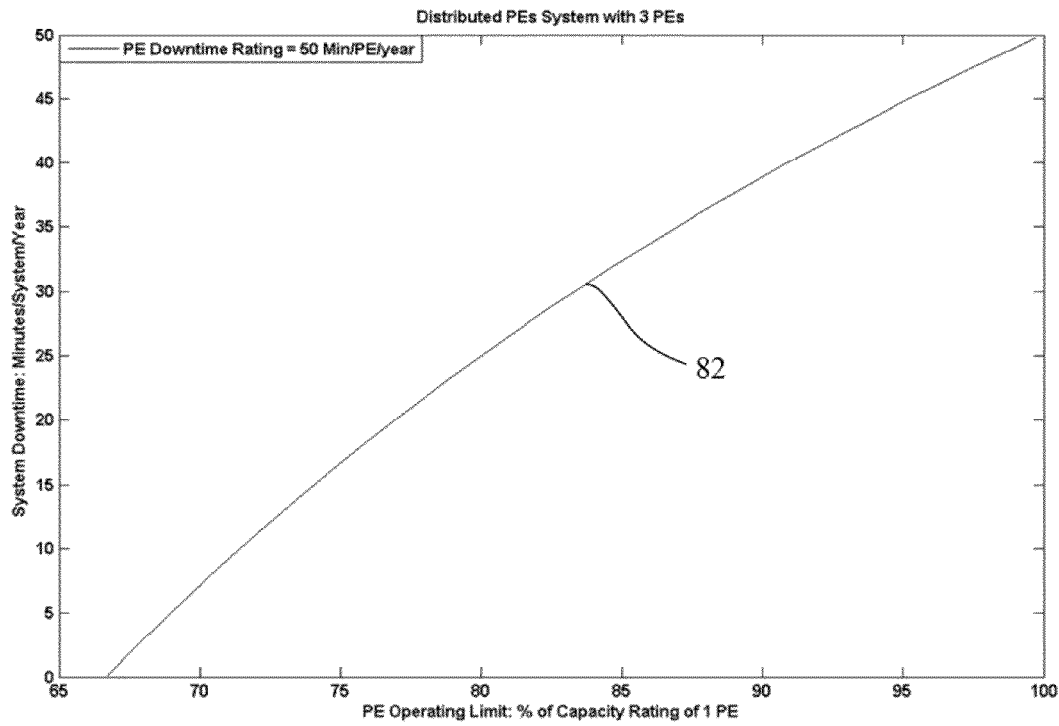
FIG. 5 shows a plot of distributed PEs system downtime as a function of system's operational limit $O_{limit}$.

FIG. 5 shows a plot 82 of distributed PEs system (i.e., a CN pool system) downtime as a function of system's operational limit $O_{limit}$. The plot 82 in FIG. 5 relates to a CN pool with 3 PEs, each PE having the downtime rating of 50 min/PE/year. Note that, at $O_{limit}=66.7\%$, the CN pool system downtime is several order of magnitude lower than the 50 min/PE/year downtime rating of an individual PE. Since $O_{limit}$ higher than 66.7% implies that the redundant or spare capacity in the system is at a fraction of the capacity rating of 1 PE, consequently, the reliability improvement with respect to the reliability of an individual PE is reduced as the $O_{limit}$ increases higher than 66.7%. When $O_{limit}$ reaches 100%, the CN pool system reliability level becomes the same as the reliability of a single PE (i.e., the CN pool system downtime=PE downtime rating=50 min/PE/year).

An important implication of the result shown in FIG. 5 is that a range of reliability system downtime SLA can be engineered through the adjustment of the $O_{limit}$. For example, at $O_{limit}$=80%, the CN pool system downtime is cut to half of the downtime rating of an individual PE. If the CN pool capacity is purchased at the 80% of the maximum CN pool capacity rating (i.e., $O_{limit}$=80%) and the 20% unpurchased portion of the system capacity is packaged and offered as a reliability SLA add on, i.e., this 20% system capacity is made available as spare capacity in the event of an outage (the total capacity usage at anytime is not allowed to exceed the purchased 80% capacity level of the CN pool), then the downtime of the CN pool can be guaranteed to be only half of the downtime rating of a PE. In the case of FIG. 5, this corresponds to the downtime reliability SLA of 25 min/system/year.

Figure 6:
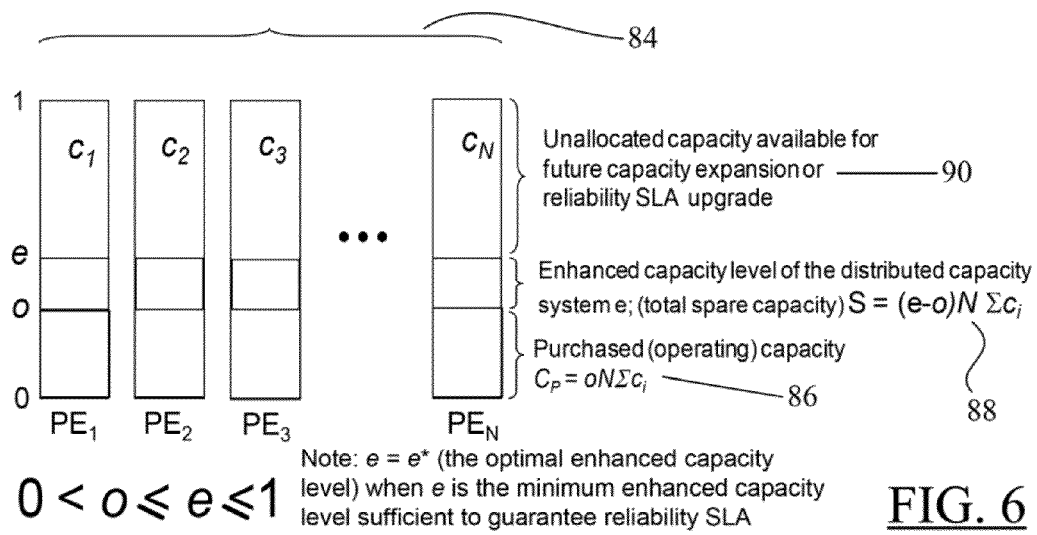
FIG. 6 is an exemplary illustration defining various parameters for an ISL license according to one embodiment of the present invention.

FIG. 6 is an exemplary illustration defining various parameters for an ISL license according to one embodiment of the present invention. As illustrated in FIG. 6, if the capacity rating of the distributed PEs system is given by $C_{system}$ and the capacity rating of each of the N PEs in the system is given by $c_j$, where j=1, 2, 3, . . . , N, then $$C_{system} = \sum_{j=1}^{N} c_j$$

as depicted in FIG. 6 by reference numeral "84". A way to provide the on demand integrated capacity and reliability SLA is to provide capacity software licenses for the purchasable operating capacity $C_p = oC_{system}$, $0 < o \le 1$, together with the purchasable reliability SLA software license. In FIG. 6, $C_p$ (across all PEs) is indicated by reference numeral "86." The reliability SLA may be realized through an allocation of a sufficient level of the enhanced (spare) capacity $S = eC_{system} - oC_{system}$, $0 < o \le e \le 1$, where, for a given reliability SLA basic order received by the ISL Manager 72 (shown in more detail in FIG. 7), an optimal enhanced capacity level e* may be determined by the ISL Manager 72 using either of the methodologies in FIGS. 10-11 discussed below. It is noted that the intended use of variable e here is for the enhanced capacity at an unspecified level of reliability SLA, whereas e* is the minimum value of e sufficient to deliver the specified reliability SLA (as also noted in FIG. 6). In FIG. 6, the spare capacity S (across all PEs) is indicated by reference numeral "88" and the remaining unallocated capacity (across all PEs) available for future capacity expansion or reliability SLA upgrade is indicated by reference numeral "90."

Figure 7:
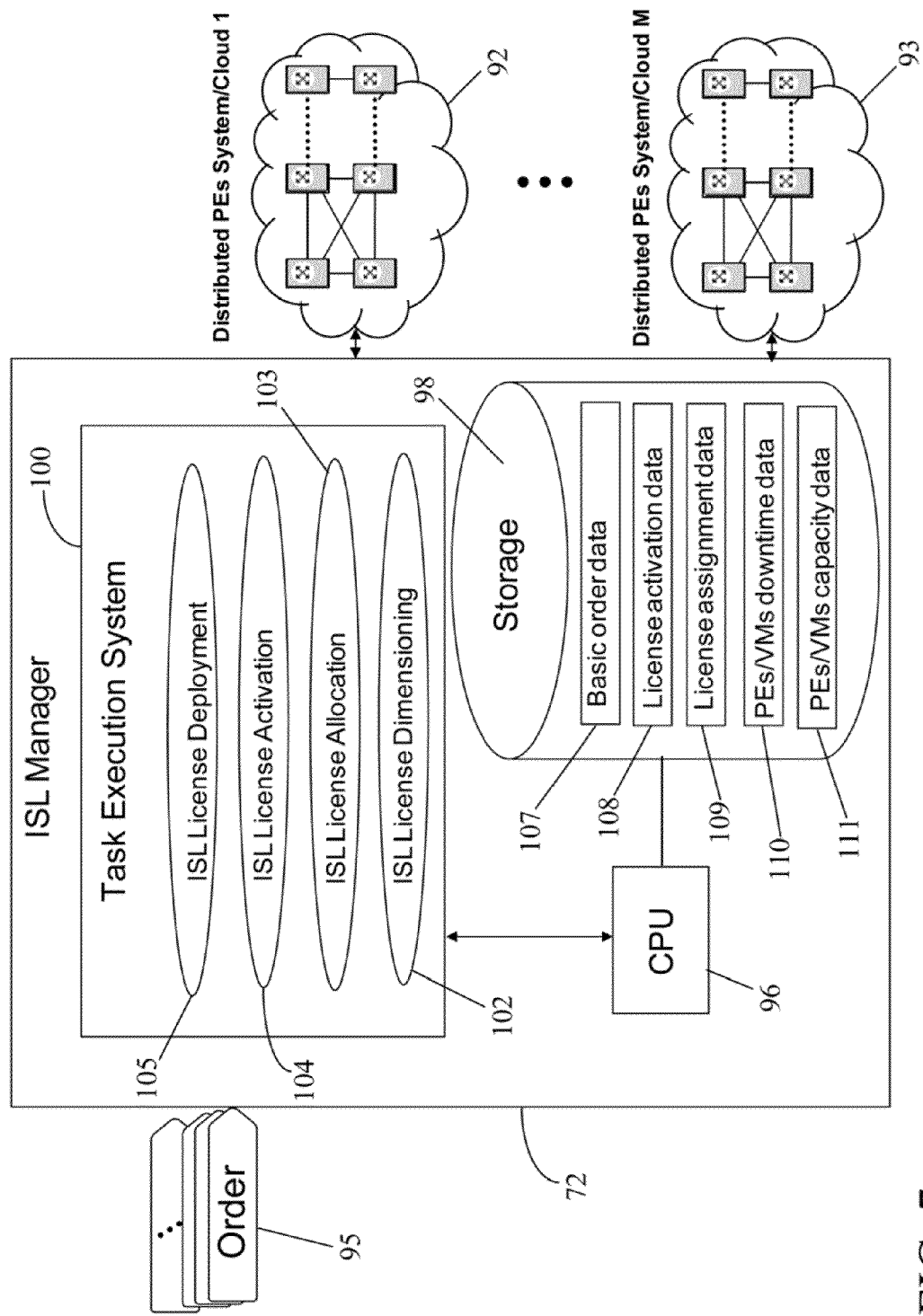
FIG. 7 shows an exemplary ISL Manager according to one embodiment of the present invention.

FIG. 7 shows an exemplary ISL Manager (ISLM) 72 according to one embodiment of the present invention. The ISLM 72 may be coupled to a number of processing resources—two of which are identified by reference numerals "92" and "93" in FIG. 7. In one embodiment, each distributed PEs system or cloud 92, 93, etc., shown in FIG. 7 may be a component resource of a larger processing resource (not shown). In any event, the ISLM 72 may grant/deny order(s) 95 for one or more ISL licenses (received from customers/users 75 (FIG. 4)) depending on its determination of whether sufficient resources are available at any of the M distributed PEs systems (or clouds) coupled thereto to support the user-requested capacity and reliability SLA in each ISL license request.

The ISL manager functionality may be implemented in hardware, software, or a combination of both. In one embodiment, the ISLM 72 may be a data processing or computing unit (e.g., a general purpose computer or PC, a workstation, a server, etc., which, in one embodiment, may be a part of the processing resource 74) having ISL license management functionality. In that case, a Central Processing Unit (CPU) 96 (or, simply, a "processor") in the ISLM 72 may execute an ISL license management application (software or program code) to enable the ISLM 72 to provide ISL license management functionality. The processor 96 may also perform various ISL licensing-related methodologies discussed herein with reference to the flowcharts in FIGS. 8, 10-11, and 13-14. The ISLM 72 may also include a computer-readable data storage medium (also interchangeably referred to herein as "memory" or "database") 98 containing program code (not shown) for ISL license management functionality, which program code may also include program code to perform various tasks managed by a Task Execution System (TES) 100 (discussed later) in the ISLM 72 and program code to facilitate performance of steps illustrated in flowcharts in FIGS. 8, 10-11, and 13-14. The processor 96 may execute instructions (or program code) stored in the database 98 to perform the general tasks 102-105 (discussed later) as well as the more-detailed steps in flowcharts in FIGS. 8, 10-11, and 13-14. The database 98 may also provide necessary data storage and retrieval during various stages of data processing being performed by the CPU 96. The data that may be stored in the database 98 include, for example, basic order data 107 (representing content of ISL license requests from customers), ISL license activation data 108 (representing activation information for ISL licenses allocated by the ISLM 72), ISL license assignment data 109 (related to information about which one or more of the M distributed PEs systems or clouds an ISL license is assigned for fulfillment), PEs/VMs downtime data 110 (representing downtime of each individual PE/VM in various distributed PEs systems/clouds coupled to the ISL Manager 72), and PEs/VMs capacity data 111 (representing capacity rating of each individual PE/VM in the distributed PEs systems/clouds coupled to the ISLM 72).

The processor 96 may include, by way of example, a general purpose processor, a special purpose processor, a conventional processor, a Digital Signal Processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor 96 may employ distributed processing in certain embodiments.

As mentioned before, the ISL manager functionality may be implemented in a computer program, software, or firmware incorporated in a computer-readable storage medium (e.g., the memory 98) for execution by a general purpose computer or a processor (e.g., the CPU 96). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the database 98 may employ distributed data storage with/without redundancy.

The task execution system 100 in the ISLM 72 may perform various tasks (using the CPU 96 as mentioned earlier) in response to customer orders 95. The tasks may include, for example, the ISL license dimensioning task 102 (which may use the methodology in FIG. 8 to determine whether a requested ISL license can be allocated), the ISL license allocation task 103, the ISL license activation task 104, and the ISL license deployment task 105 (in which an activated ISL license may be deployed/assigned to a specific distributed PEs system/cloud for fulfillment).

It is noted here that additional architectural details of the ISLM 72 are not shown in FIG. 7 merely for the sake of simplicity. Thus, for example, input/output (I/O) devices (e.g., a computer keyboard, a touch-screen, a computer display monitor, a computer mouse, etc.) attached to or associated with the ISLM 72 are not shown in FIG. 7. Similarly, additional external devices (e.g., user computers or data processing systems) that may interact with the ISLM 72 or that may receive communications from the ISLM 72 are also not illustrated in FIG. 7 for the sake of simplicity. However, it is understood that various I/O and other external devices/systems may be used in conjunction with the ISLM 72 to accomplish various user functions, e.g., to input ISL license order data, to modify/upgrade an existing ISL license, to display results of customer orders for ISL licenses processed by the ISLM 72, etc.

Figure 8:
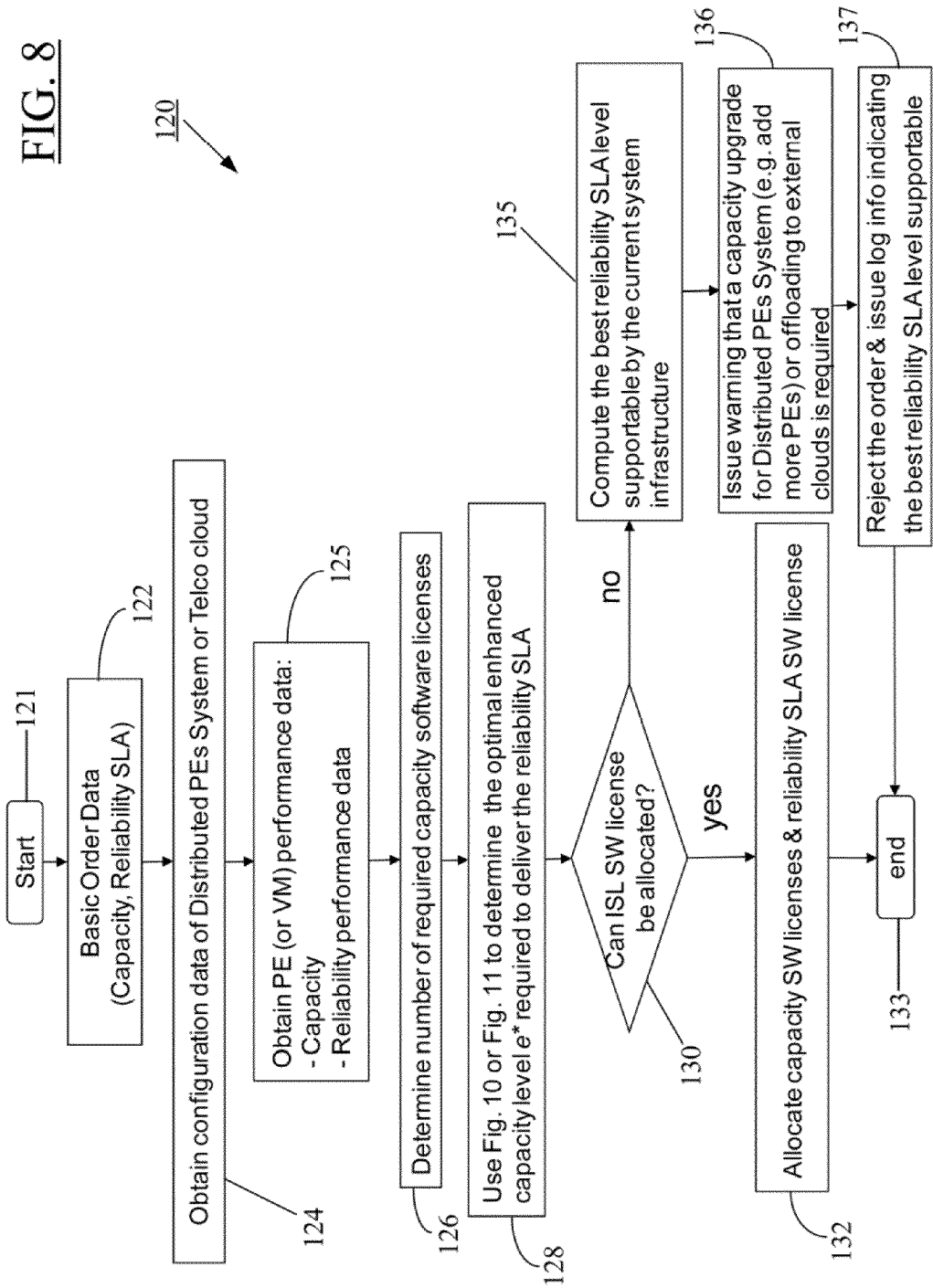
FIG. 8 is an exemplary flowchart depicting how an ISL license may be dimensioned by the ISL Manager according to one embodiment of the present invention.

FIG. 8 is an exemplary flowchart 120 depicting how an ISL license may be dimensioned by the ISL Manager 72 according to one embodiment of the present invention. As mentioned earlier, in one embodiment, the ISL license dimensioning task 102 may be performed by the ISLM 72 through execution of steps illustrated in, the flowchart 120. When an order for a new or upgraded capacity and reliability SLA SW license is received (blocks 121-122 in FIG. 8), the ISLM 72 (or, more specifically, the TES system 100 in the ISLM 72) may query its database 98 to obtain the current configuration data of each distributed PEs system or telco cloud (block 124) that may be a candidate to which the user-requested ISL license (if granted) may be assigned, and to also obtain the capacity and reliability performance data of each individual PE (or VM) in each distributed PEs system/cloud under consideration (block 125). In one embodiment, the ISLM 72 may also receive, from ISLC 77, the most current usage and health status of PEs in the system to assist ISLM in granting/denying ISL license orders from users. For the sake of simplicity and ease of discussion, the term "system" is conveniently and interchangeably used herein (as may be evident from the context of discussion) to refer to such a distributed PEs system (or a combination of two or more distributed PEs systems) or a VM-based cloud (or a combination of clouds) or any other system providing processing/capacity resources to support ISL licensing according to the teaching of the present invention. Based on the PE/VM performance data obtained at block 125, the ISLM 72 may determine the number of capacity software licenses that may be required to fulfill the user's capacity requirements in the user-requested ISL (block 126). In one embodiment, to obtain the number of capacity software licenses required for the user-specified amount of capacity, the ISLM 72 may divide the requested amount of capacity by the amount of capacity for 1 capacity software license and round up the result to the next nearest integer. Thereafter, the ISLM 72 may use the methodology in FIG. 10 (or FIG. 11, as applicable) (both of these figures are discussed below) to determine the optimal enhanced capacity level (i.e., optimal level of spare capacity) e* required to deliver the reliability SLA requested in the user's order (block 128). At block 130, the ISLM 72 may determine whether any of the currently-considered distributed PEs system(s) or the telco cloud infrastructure can support the number of capacity software licenses (determined at block 126) and the enhanced capacity level e* (determined at block 128). If the determination at block 130 is in the affirmative (indicating that there are sufficient resources to fulfill user's order for requested capacity and reliability SLA), then the ISLM 72 may allocate the ISL SW license for this order and may intimate the user accordingly (blocks 132-133). In one embodiment, an "Order Granted" or "Order Accepted" message may be displayed on a user's computer terminal. However, if there are insufficient resources to allocate the user-requested ISL SW license(s), the ISLM 72 may compute the best capacity and reliability SLA level supportable by the current system infrastructure (block 135). The ISLM 72 may also display a warning (e.g., to an administrator or human operator overseeing the ISL Manager 72) that an infrastructure upgrade (e.g., addition of more PEs to upgrade the capacity of the distributed PEs system) or an off-loading to external clouds may be required to accommodate the present order (block 136). Furthermore, the ISLM 72 may reject the order and issue a log entry showing the best capacity and reliability SLA level supportable by the current system infrastructure (block 137). If the order is rejected, the user may receive a message like "Order Rejected" or "Order Denied" on user's computer. In one embodiment, if the entire order cannot be fulfilled, the ISLM 72 may recommend partial fulfillment based on available resources and may inform the user as to what capacity and reliability SLA level may be allocated. If the user accepts the ISLM 72 recommendation, the user (or the ISLM 72) may modify the current order accordingly for a new/revised ISL SW license.

Figure 9:
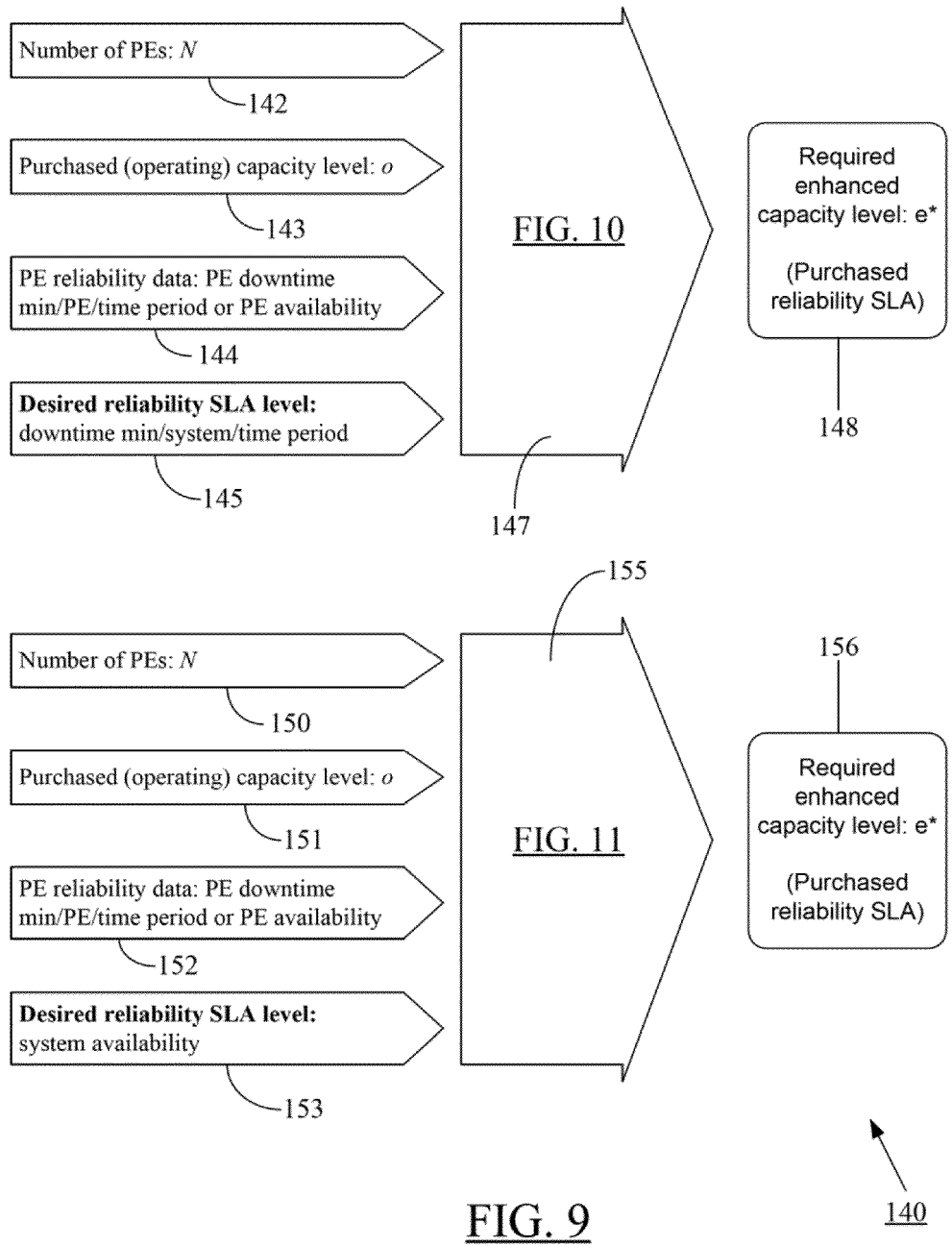
FIG. 9 illustrates an exemplary diagram according to one embodiment of the present invention showing inputs and outputs for determining optimal enhanced capacity level e* needed to achieve the desired reliability SLA.
Figure 10:
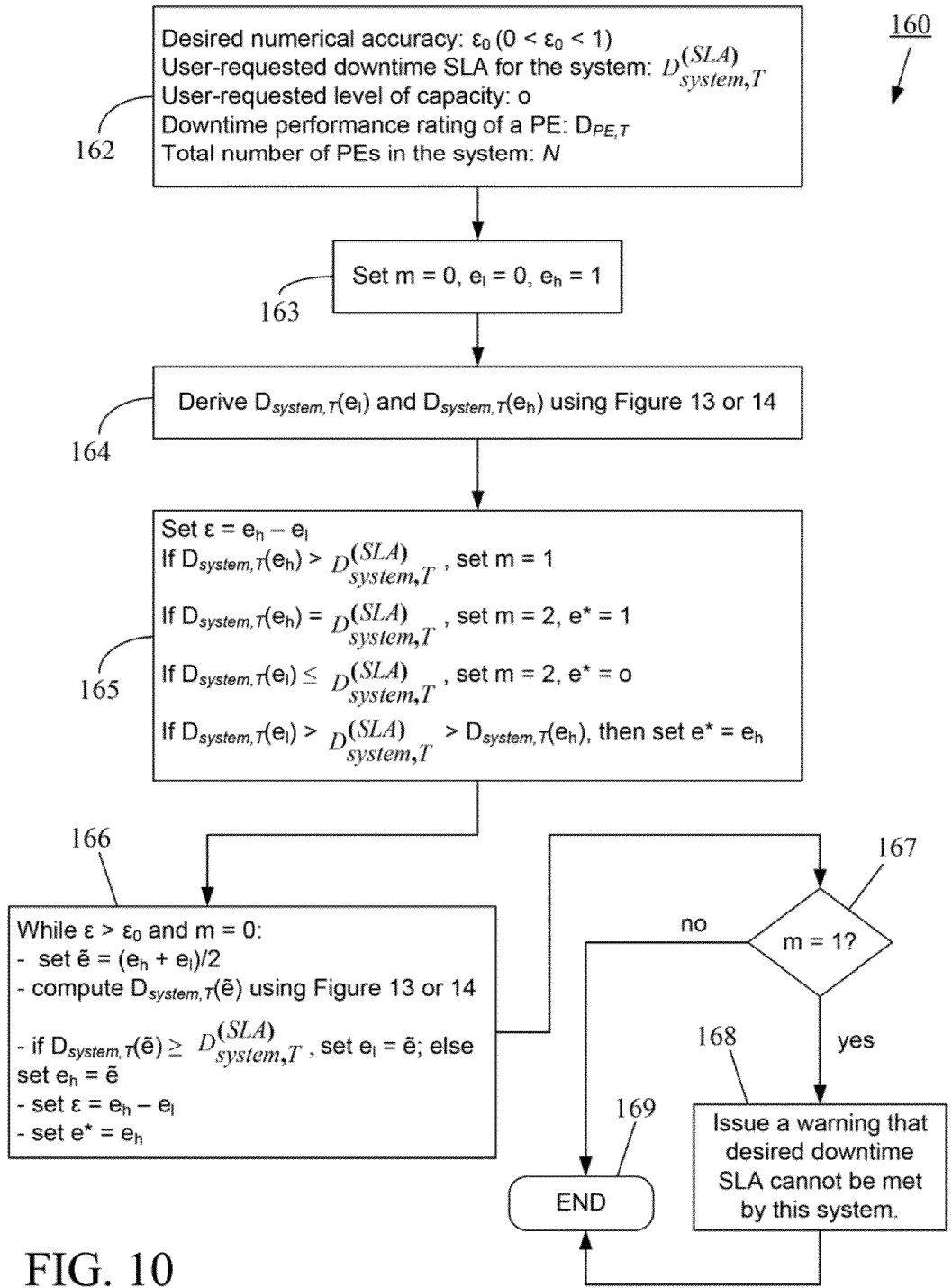
FIG. 10 shows an exemplary flowchart depicting a methodology according to one embodiment of the present invention to compute the optimal enhanced capacity level e* using user-requested downtime SLA for the system.
Figure 11:
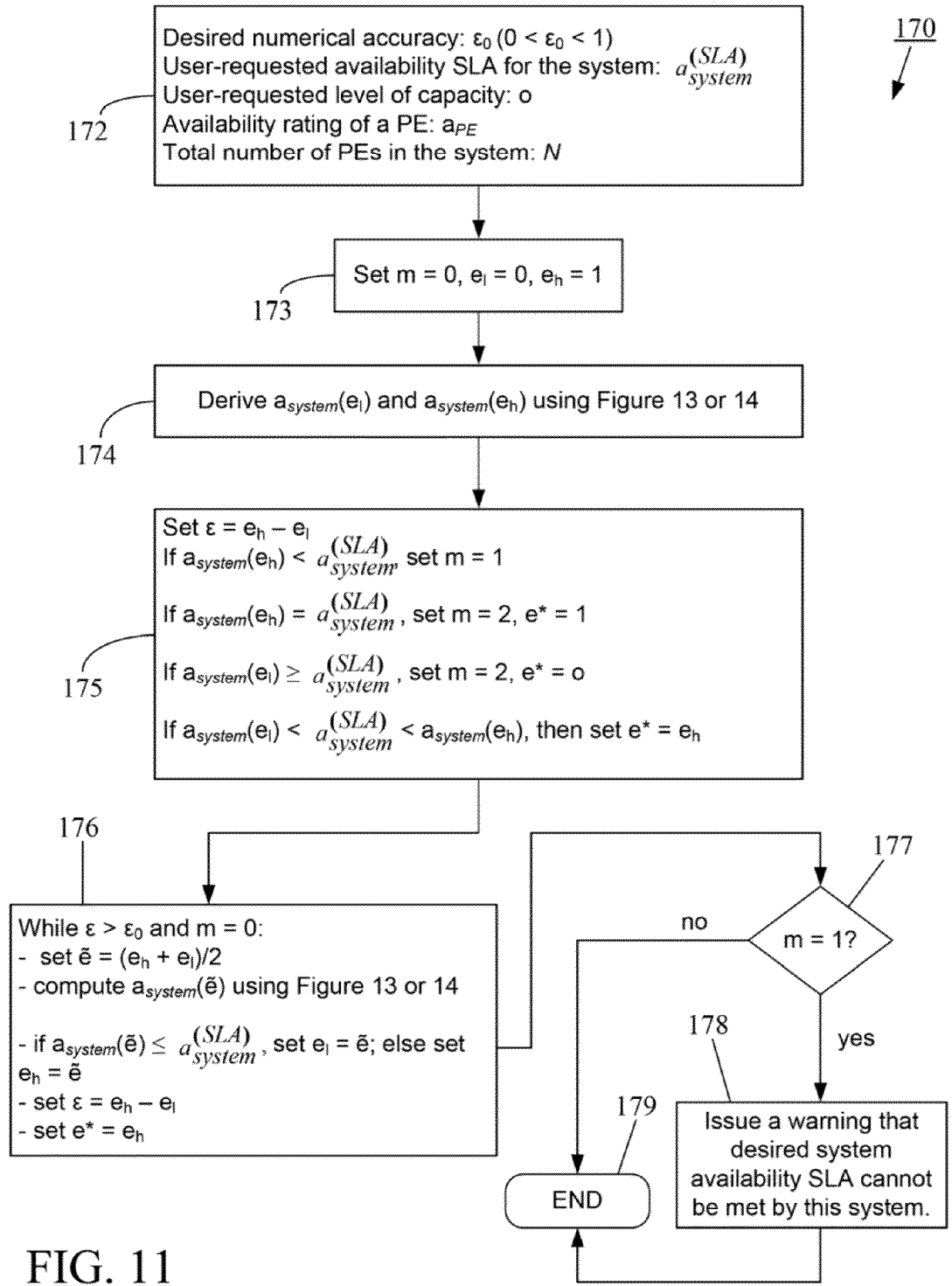
FIG. 11 shows an exemplary flowchart depicting a methodology according to one embodiment of the present invention to compute the optimal enhanced capacity level e* using user-requested availability SLA for the system.

FIG. 9 illustrates an exemplary diagram 140 according to one embodiment of the present invention showing inputs 142-145, 150-153 and outputs 148, 156 for determining optimal enhanced capacity level e* needed to achieve the desired reliability SLA. As shown in FIG. 9, inputs 142-145 may be used in the methodology of FIG. 10 (as indicated by an arrow labeled with reference numeral "147") to generate an output 148 specifying the required enhanced capacity level e* needed to accommodate the user-purchased reliability SLA. Similarly, inputs 150-153 may be used in the methodology of FIG. 11 (as indicated by an arrow labeled with reference numeral "155") to generate an output 156 specifying the required enhanced capacity level e* needed to accommodate the user-purchased reliability SLA. The methodologies in FIGS. 10-11 are discussed in more detail below. Each of the inputs 142 and 150 includes the total number (N) of PEs in the distributed PEs system or VM-based cloud (more simply, the "system") to which the user's ISL order may be assigned (e.g., any of the systems 92, 93, etc. in FIG. 7, or a "system" resulting from a combination of two or more of such individual systems). Each of the inputs 143, 151 is the parameter "o" ($0<o\leq1$) (FIG. 9) specifying the user-purchased (operating) capacity level (i.e., the portion of the system capacity purchased by the user as discussed earlier). Each of the inputs 144, 152 relates to PE reliability data in terms of PE downtime information (indicated, for example, as min/PE/time period) or PE availability information of a single PE in the system. In one embodiment, it may be assumed for the inputs 144, 152 that each PE in the system has the same downtime performance rating. In another embodiment, the inputs 144, 152 may relate to downtime rating of a PE having the worst downtime rating among all PEs in the system. Finally, input 145 is the desired reliability SLA level—in terms of downtime minutes per system per given time period (e.g., a year, a month, etc.)—as may be specified in the user's order (received by ISLM 72 as discussed with reference to FIG. 7), whereas input 153 is the desired reliability SLA level specified (in the user's order) in terms of system availability (e.g., 4 9's (0.9999 or 99.99%) monthly availability, six 9's (0.999999 or 99.9999%) yearly availability, 98.95% or 0.9895 monthly uptime, etc.). Thus, in one embodiment, a user may specify desired reliability SLA in one of these two ways, and the ISLM 72 may select the appropriate methodology (FIG. 10 or FIG. 11) to determine the optimal enhanced capacity level e* as discussed below.

FIG. 10 shows an exemplary flowchart 160 depicting a methodology according to one embodiment of the present invention to compute the optimal enhanced capacity level e* using user-requested downtime SLA ($D_{system,T}^{(SLA)}$) (block 145, FIG. 9) for the system. On the other hand, FIG. 11 shows an exemplary flowchart 170 depicting a methodology according to one embodiment of the present invention to compute the optimal enhanced capacity level e* using user-requested availability SLA ($a_{system}^{(SLA)}$) (block 153, FIG. 9) for the system. Except for the different types of user inputs ($D_{system,T}^{(SLA)}$ in case of FIG. 10 and $a_{system}^{(SLA)}$ in case of FIG. 11) and resulting modifications in appropriate flowchart steps, the methodologies in FIGS. 10 and 11 are substantially similar and, hence, duplicate discussion of such similar steps in FIGS. 10 and 11 is not provided herein for the sake of brevity. Thus, although FIG. 10 is primarily discussed below, references to corresponding portions in FIG. 11 are also made simultaneously. It is observed here that because of interchangeable nature of the methodologies in FIGS. 10 and 11, either of the flowcharts 160, 170 may be used to determine the optimal level of spare capacity e* from a given set of inputs (shown in FIG. 9).

The minimum/optimal enhanced operating (capacity) limit e* of the system may be computed within a given numerical accuracy $\epsilon_0$ using a number of inputs (block 162 in FIG. 10 and block 172 in FIG. 11). As mentioned with respect to FIG. 9, the inputs in case of the flowchart 160 in FIG. 10 are: (i) the user-desired reliability SLA (received from the user in terms of downtime SLA for the system, i.e., $D_{system,T}^{(SLA)}$) (block 145, FIG. 9), (ii) the user-requested (or user-purchased) system capacity level "o" (block 143, FIG. 9), (iii) the total number (N) of PEs in the system (block 142, FIG. 9), and (iv) PE reliability data (or downtime performance rating) $D_{PE,T}$ of a single PE in the system (block 144, FIG. 9). The PE reliability/downtime data $D_{PE,T}$ may be specified in terms of PE downtime ($D_{PE}$) in minutes per PE over a pre-determined duration "T" (e.g., a year, a month, etc.). In the discussion herein, the terms "$D_{PE,T}$" and "$D_{PE}$" may be used interchangeably for clarity, as may be evident from the context of discussion. Instead of $D_{PE,T}$, if PE availability rating ($a_{PE}$) is specified (or present in the ISLM storage 98, FIG. 7), then $D_{PE,T}$ may be computed using the equation: $D_{PE}=(1-a_{PE})T$. In case of FIG. 11, the inputs at block 172 are essentially the same, except that instead of $D_{PE,T}$ in FIG. 10, the (equivalent) availability rating $a_{PE}$ may be specified in FIG. 11, and instead of receiving $D_{system,T}^{(SLA)}$ from the user in case of FIG. 10, the (equivalent) availability SLA for the system (i.e., $a_{system}^{(SLA)}$) may be received from the user as an input. Blocks 145 and 153 in FIG. 9 illustrate this difference.

Given the desired numerical accuracy $0 < \epsilon_0 < 1$ (e.g., $\epsilon_0 \leq 10^{-4}$) and various other inputs (at blocks 162 and 172 as discussed above), the methodologies in flowcharts 160, 170 may perform a bisection search (through various steps shown in FIGS. 10-11), over the whole range of $0 < e \leq 1$, utilizing the methodologies in FIG. 13 or 14 (as appropriate), which produce $D_{system,T}$ for a given set of e, o, and $D_{PE,T}$ as discussed later hereinbelow with reference to discussion of FIGS. 13 and 14. In other words, either of the methodologies in FIGS. 13 and 14 may be used to calculate the system downtime ($D_{system,T}$) from an individual PE's downtime performance rating ($D_{PE,T}$), or equivalently, to calculate the system availability ($a_{system}$) from the individual PE's nodal availability rating ($a_{PE}$).

Referring again to FIGS. 10-11, the execution of various flowchart steps may begin with the initialization at blocks 163, 173 that may be carried out (by ISLM 72 as mentioned earlier) by setting variables m=0, $e_l$=0 (set the lower value for the enhanced operating limit "e" the same as the purchased capacity level, i.e., no spare capacity in the context of various parameters shown in FIG. 6), and $e_h$=1 (set the upper value for the enhanced operating limit "e" at a PE's maximum capacity rating, i.e., the maximum available spare capacity in the context of various parameters shown in FIG. 6). As mentioned earlier, in the discussion of FIGS. 10-11 and 13-14, each PE in the system may be considered to have the same capacity and reliability ratings. Hence, various system-based values may be easily computed from a single PE's data as discussed herein. However, in other embodiments, such assumption may be modified as desired to take into account differences among individual PE capacity and performance ratings. As shown at block 164 in FIG. 10, the methodology in FIG. 13 (or FIG. 14, as appropriate) may be used to derive system-specific downtime values for a given "e" (either "$e_l$" or "$e_h$")—i.e., $D_{system,T}(e_l)$ and $D_{system,T}(e_h)$. As mentioned earlier, discussion of FIGS. 13 and 14 is provided later hereinbelow. In case of block 174 in FIG. 11, FIG. 13 or 14 may be used to derive (equivalent) system availability values $a_{system}(e_l)$ and $a_{system}(e_h)$.

At block 165 in FIG. 10, after setting $\epsilon=e_h-e_l$, a number of determinations may be made by ISLM 72. For example, if it is determined that $D_{system,T}(e_h) > D_{system,T}^{(SLA)}$, then there may not be enough system spare capacity available to provide the user-desired level of downtime SLA, in which case the value of m may be set equal to 1 (i.e., m=1). On the other hand, if $D_{system,T}(e_h) = D_{system,T}^{(SLA)}$, then ISLM 72 may set m=2 and e*=1 (indicating that maximum spare capacity is needed to meet the desired downtime SLA). If $D_{system,T}(e_l) \leq D_{system,T}^{(SLA)}$, then ISLM 72 may set m=2 and e*=0 (indicating that no spare capacity is needed to meet the user-desired downtime SLA). It is observed here that in case of m=2 (block 165), the process may not execute blocks 166 through 168, but may simply end at block 169 with one of the corresponding values of e* (0 or 1) determined at block 165. However, if $D_{system,T}(e_l) > D_{system,T}^{(SLA)} > D_{system,T}(e_h)$, then ISLM 72 sets e*=$e_h$ and continues to block 166. On the other hand, the process may instead continue to blocks 167-168 if the value of m=1 is set at block 165.

The ISLM 72 may execute the following sub-routine at block 166, provided that $\epsilon > \epsilon_0$ and m=0, before concluding the process at block 169:

While $\epsilon > \epsilon_0$ and m = 0 do:

set $\tilde{e} = \dfrac{e_h + e_l}{2}$

Figure 13:
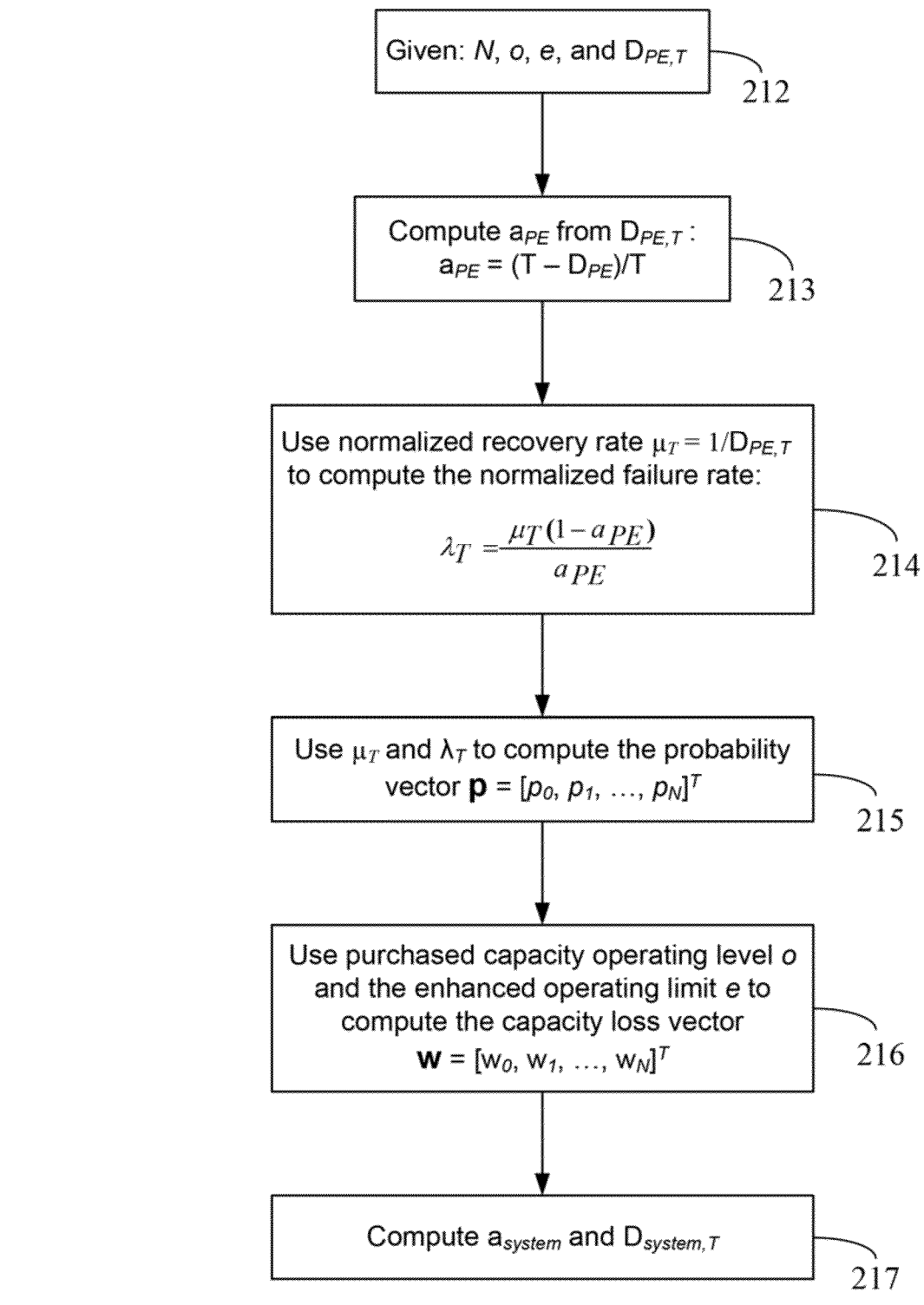
FIG. 13 illustrates an exemplary flowchart depicting a methodology according to one embodiment of the present invention to compute system availability and system downtime from a single PE's downtime information.

Use FIG. 13 (or FIG. 14, as applicable) to compute $D_{system,T}(\tilde{e})$
If $D_{system,T}(\tilde{e}) \geq D_{system,T}^{(SLA)}$, set $e_l = \tilde{e}$; else, set $e_h = \tilde{e}$
set $\epsilon = e_h - e_l$
set e* = $e_h$
end If m=1 (block 167), then ISLM 72 may issue a warning (e.g., to the user, to an operator, etc.) that the desired downtime SLA (i.e., $D_{system,T}^{(SLA)}$) cannot be met by this system. As mentioned earlier, such warning may be displayed on a user and/or operator's computer terminals, and an option for partial fulfillment of user's order also may be presented to the user.

As noted earlier, except for the different types of user inputs ($D_{system,T}^{(SLA)}$ in case of FIG. 10 and $a_{system}^{(SLA)}$ in case of FIG. 11) and resulting modifications in relevant flowchart steps (see, e.g., the reversed inequality relations in blocks 165 and 175 and also in blocks 166 and 176 in FIGS. 10 and 11, respectively), the methodologies in FIGS. 10 and 11 are substantially similar. Hence, additional discussion of blocks 175 through 179 in FIG. 11 is not provided herein because it is self-explanatory in view of discussion of corresponding blocks 165 through 169 in FIG. 10 provided above.

Figure 12:
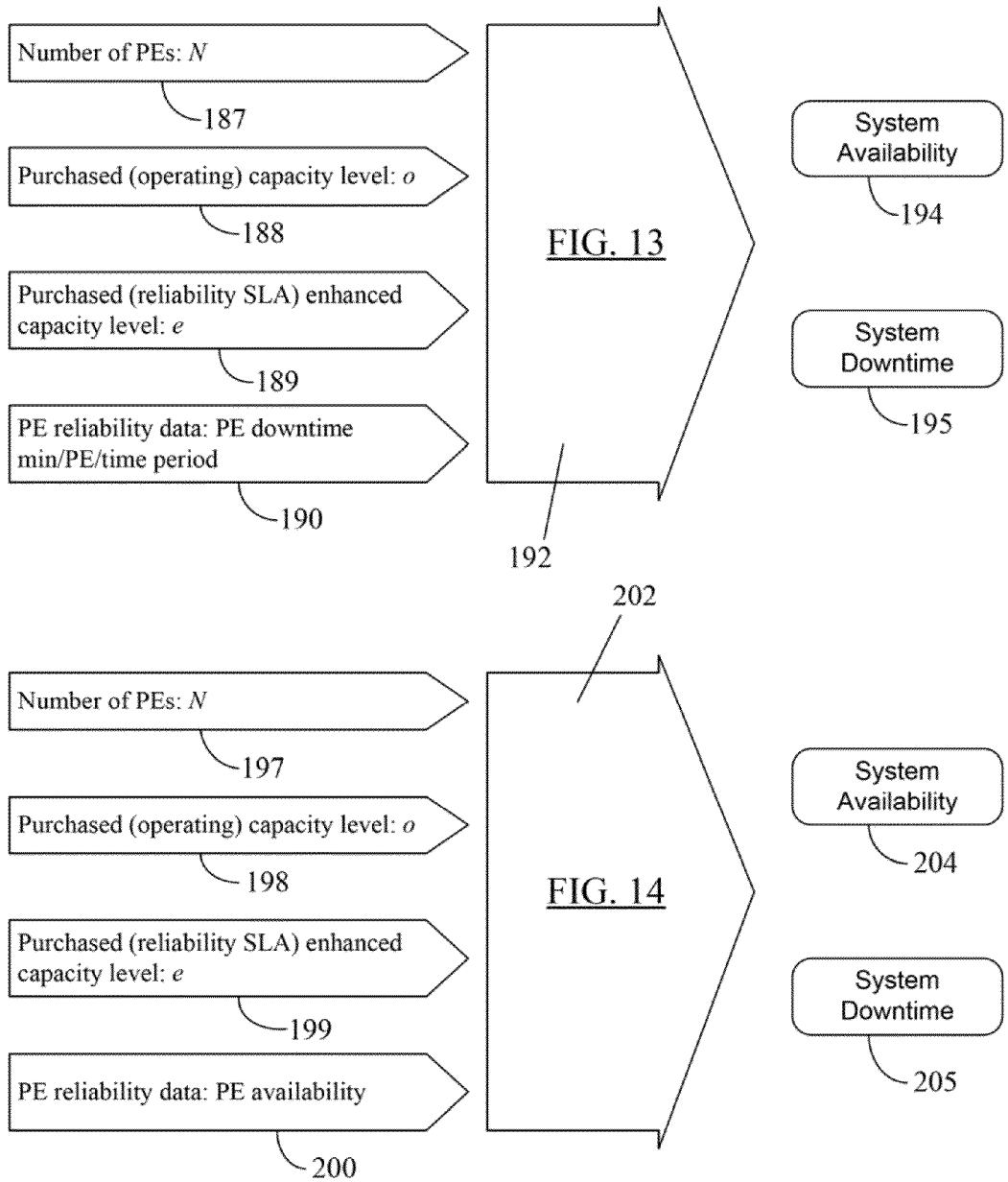
FIG. 12 depicts an exemplary diagram according to one embodiment of the present invention showing inputs and outputs for computing system reliability based on reliability data of a single PE in the system.

FIG. 12 depicts an exemplary diagram 185 according to one embodiment of the present invention showing inputs 187-190, 197-200 and outputs 194-195, 204-205 for computing system reliability based on reliability data of a single PE in the system. As shown in FIG. 12, inputs 187-190 may be used in the methodology of FIG. 13 (as indicated by an arrow labeled with reference numeral "192") to generate an output 194 specifying system availability ($a_{system}$) and an (equivalent) output 195 specifying system downtime ($D_{system,T}$). Similarly, inputs 197-200 may be used in the methodology of FIG. 14 (as indicated by an arrow labeled with reference numeral "202") to generate an output 204 specifying system availability and an (equivalent) output 205 specifying system downtime. The methodologies in FIGS. 13-14 are discussed in more detail below. Each of the inputs 187 and 197 includes the total number (N) of PEs in a distributed PEs system or VM-based cloud (more simply, the "system") (e.g., any of the systems 92, 93, etc. in FIG. 7, or a "system" resulting from a combination of two or more of such individual systems). Such a system may include the system to which the user's ISL order may be assigned (e.g., by the ISLM 72). Each of the inputs 188, 198 is the parameter "o" (0<o≤1) (FIG. 12) specifying the user-purchased (operating) capacity level (i.e., the portion of the system capacity purchased by the user as discussed earlier). Each of the inputs 189 and 199 relates to enhanced (operating) capacity level "e" needed for the user-purchased (or user-requested) reliability SLA. It is again noted that the intended use of variable e here is for the enhanced capacity at an unspecified level of reliability SLA, whereas e* is the minimum value of e sufficient to deliver the specified reliability SLA (as shown in FIG. 6). The user would purchase the optimal enhanced capacity level e* determined through the steps in FIG. 10 or 11. As mentioned earlier in the context of equation (1), an example case is given for the system downtime calculation based on the individual, PE downtime by setting e=1 and $$o = \frac{O_{limit}}{100}$$

while using the methodology discussed below with reference to FIG. 13 or 14. Finally, the input 190 relates to PE reliability data in terms of PE downtime information ($D_{PE,T}$) (indicated, for example, as min/PE/time period (T)—e.g., downtime of 15 minutes/PE/year) of a single PE in the system. On the other hand, the input 200 relates to PE reliability data in terms of PE availability information ($a_{PE}$) (e.g., 99.995% yearly availability) of a single PE in the system. In one embodiment, it may be assumed for the inputs 190, 200 that each PE in the system has the same downtime performance rating. In another embodiment, the inputs 190, 200 may relate to downtime rating of a PE having the worst downtime rating among all PEs in the system. Thus, the relevant flowchart in FIG. 13 or FIG. 14 may be used (e.g., by the ISLM 72) based on how PE reliability data is available (whether as PE downtime data 190 or as PE availability data 200). Similarly, each of the flowcharts in FIGS. 13 and 14 may provide two types of (equivalent) outputs for system reliability information: (i) in the form of system availability information 194, 204, or (ii) in the form of system downtime information 195, 205. As mentioned before, the methodologies in FIGS. 13 and 14 (discussed below) may be used to derive system level reliability information from the reliability rating of a single PE in that system.

FIG. 13 illustrates an exemplary flowchart 210 depicting a methodology according to one embodiment of the present invention to compute system availability ($a_{system}$) and system downtime ($D_{system,T}$) from a single PE's downtime information ($D_{PE,T}$). On the other hand, FIG. 14 illustrates an exemplary flowchart 220 depicting a methodology according to one embodiment of the present invention to compute system availability ($a_{system}$) and system downtime ($D_{system,T}$) from a single PE's availability information ($a_{PE}$). In case of the flowchart 210 in FIG. 13, the inputs at block 212 (for various computations associated with the flowchart 210) may include the inputs specified at blocks 187 through 190 in FIG. 12. Similarly, in case of FIG. 14, the inputs at block 222 may include the inputs specified at blocks 197 through 200 in FIG. 12 along with an additional input specifying the value of "T" (i.e., the time duration or time period (e.g., one year, six months, four weeks, etc.) used in indicating PE downtime $D_{PE,T}$). At block 213 in FIG. 13, PE availability may be computed (e.g., by the ISLM 72) from PE downtime information using the equation:

$$a_{PE} = \frac{T - D_{PE}}{T} \qquad (2)$$

Figure 14:
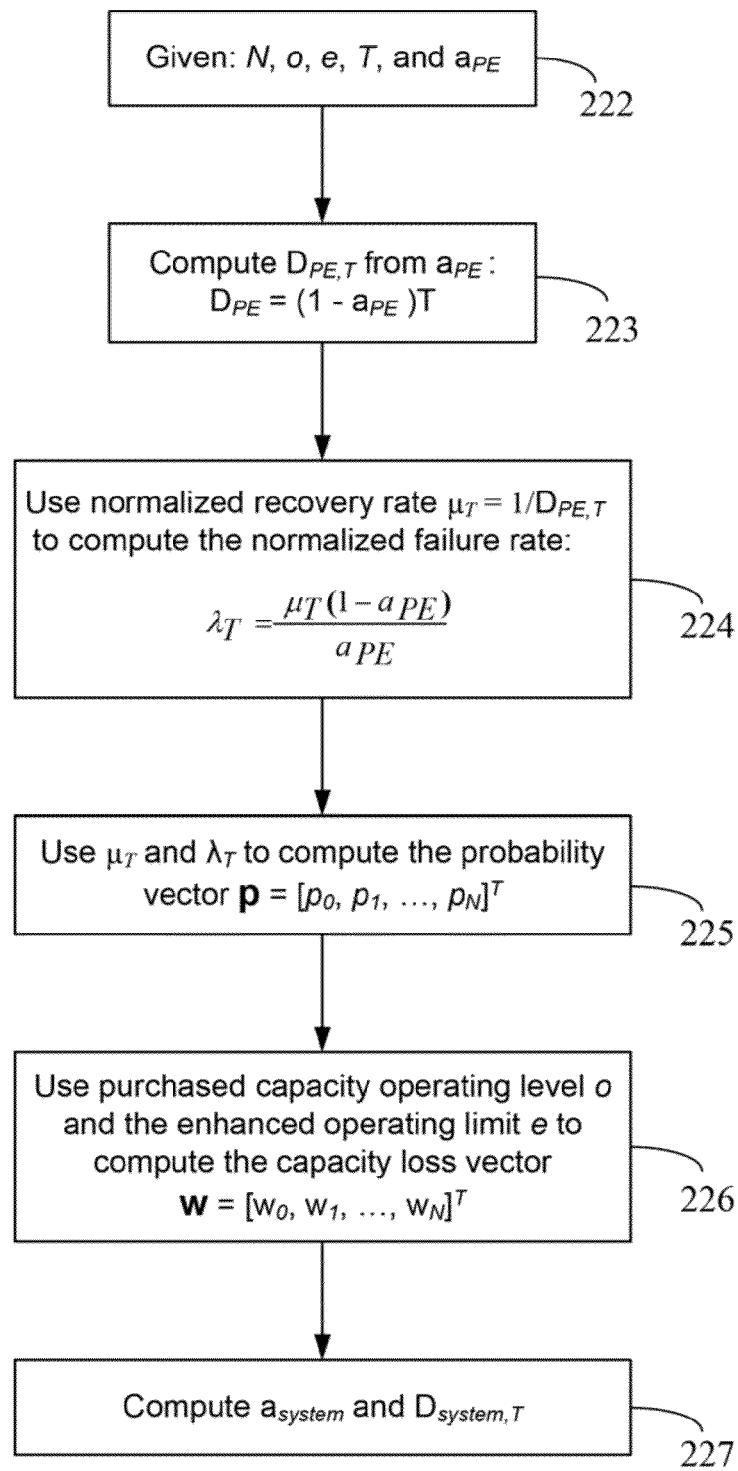
FIG. 14 illustrates an exemplary flowchart depicting a methodology according to one embodiment of the present invention to compute system availability and system downtime from a single PE's availability information.

On the other hand, in case of block 223 in FIG. 14, PE downtime information may be computed from the (equivalent) PE availability information using the equation:

$$D_{PE}(1-a_{PE})^T \qquad (3)$$

Prior to discussing the remaining blocks in the flowcharts 210, 220 in FIGS. 13 and 14, respectively, a brief mathematical overview of a reliability model for a distributed PEs system is provided. The modeling of fractional PE capacity redundancy for the distributed PEs system is discussed to illustrate how the model may be used to calculate the system downtime target from the individual PE downtime performance rating, or equivalently, to calculate the system availability from the individual PE nodal availability rating. The model may allow continuous adjustment of system-wide spare capacity level (as opposed to discrete adjustment of a whole PE capacity unit), thereby making it possible to determine the minimum required system-wide spare capacity level needed to meet the given (i.e., user-desired) reliability SLA (which may be specified, as mentioned earlier, in terms of either system downtime or system availability requirement) for any purchased capacity level—as discussed earlier in the context of FIGS. 10 and 11.

Initially, one may consider a system which comprises N PEs, each PE having an equal capacity rating c. This assumption may reduce the number of Markov states down from $2^N$ to just N as shown in FIG. 15, which illustrates Markov states in a system of distributed PEs (or a VM-based cloud) having N subsystems of equal capacity. The states (some of which are identified by reference numerals "230" through "233") in the state transition diagram in FIG. 15 represent the different operating states the system can be in and the transitions between the states represent all the possible future states and the rates of transitions to those future states—wherein "λ" represents PE failure rate (e.g., x failures per unit time where the time unit may be an hour, a week, a month, or a year, etc.) and "μ" represents PE recovery rate (e.g., y recoveries per unit time). Thus, in FIG. 15, state i, i=0, 1, . . . , N, may represent the state where i PEs are in the "active" state, i.e., there are N-i PEs in the "down" or outage state. The probability that the Markov chain is in state i at time t may be given by $p_i(t)$, i=0, 1, . . . , N, and the state probability vector may be given by the length N+1 column vector $p(t)=[p_0(t), p_1(t), \ldots, p_N(t)]^T$. The solution at any time t of the state probability vector, p(t), can be derived from the Chapman-Kolmogorov differential equation, $$\frac{dp(t)}{dt} = Qp(t). \tag{4}$$

In the above equation (4), Q is the transition rate matrix, and its elements satisfy $q_{ij} \geq 0$ for $i \neq j$ and $q_{ii} = -\Sigma_{j=1, j\neq i}^N q_{ij}$ for all i=1, 2, . . . , N. The transition rate matrix Q for the state transition diagram in FIG. 15 may be given by:

$$Q = \begin{pmatrix} -\mu & 0 & 0 & \Lambda & 0 & 0 & \mu \\ \lambda & -(\lambda+\mu) & 0 & \Lambda & 0 & 0 & \mu \\ 0 & 2\lambda & -2\lambda & \Lambda & 0 & 0 & \mu \\ M & M & M & O & M & M & M \\ 0 & 0 & 0 & \Lambda & (N-1)\lambda & -\{(N-1)\lambda+\mu\} & \mu \\ 0 & 0 & 0 & \Lambda & 0 & N\lambda & -N\lambda \end{pmatrix}_{(N+1)\times(N+1)} \tag{5}$$

In this analysis, the stationary solution of the Markov chain is what may be required. This solution may be obtained by setting the left side of equation (4) to zero and solving the homogeneous linear system of equations with the constraint $\Sigma_{i=0}^N p_i = 1$. This may be represented in matrix equation:

$$Qp=0, \text{ having the constraint } \Sigma_{i=0}^N p_i = 1 \tag{6}$$

Assuming that the Markov chain is ergodic, then the fact that the system of equations (6) is homogeneous may not create any problems, since any of the N+1 equations may be replaced by the normalizing equation, $$\sum_{i=0}^{N} p_i = 1,$$

thereby converting the system (in equation (6)) into a non-homogeneous system with a non-singular coefficient matrix and non-zero right hand side. The solution, for the state probability vector p, in this case is well defined. Solving equation (6) using the direct method discussed herein may work well when the number of states is "small" (i.e., less than a few thousands states).

Let the capacity rating vector of the N PEs be $c=[c_1, c_2, \ldots, c_N]_N^T$ (see FIG. 6 for an exemplary illustration of individual PE capacity). If the purchased capacity level of the system is $C_p$ and the normalized operating limit with respect to the PE capacity rating is $o=[o, o, \ldots, o]_N^T$, $0<o\leq 1$, then $$C_p = o^T c = o \sum_{j=1}^{N} c_j \tag{7}$$

If each PE has the same capacity rating, c, then equation (7) becomes $C_p=ocN$.

In order to allow modeling of sparing of fractional PE capacity, suppose the purchased system redundant capacity that can be accessed in the event of outage is S, where $S \in R^+$, i.e., S can be any fraction of full system capacity rating ($R^+$) (instead of just a sum of a subset of $\{c_1, c_2, \ldots, c_N\}$ or multiple of c in the case where PEs have equal capacity rating). Let the enhanced operating limit after outage with respect to the PE capacity rating be $e=[e, e, \ldots, e]_N^T$, $0<o\leq e\leq 1$, then $$S = e^T c - o^T c = (e-o)\sum_{j=1}^{N} c_j \tag{8}$$

If k PEs fail, k=0, 1, 2, . . . , N, then the capacity loss from the outages may be $^o\Sigma_{k\ failed\ PEs}\ c_j$. The remaining spare capacity may be given as $^{(e-o)}\Sigma_{N-k\ active\ PEs}\ c_j$. If the remaining spare capacity is sufficient to replace the capacity loss, then the outages incur zero downtime; otherwise, there may be a partial loss of capacity in the amount of $$o\sum_{k\ failed\ PEs} c_j - (e-o)\sum_{N-k\ active\ PEs} c_j = o\sum_{j=1}^{N} c_{j-e} \sum_{N-k\ active\ PEs} c_j.$$

Therefore, the amount of partial capacity loss is max $$\left(0, o\sum_{j=1}^{N} c_{j-e} \sum_{N-k\ active\ PEs} c_j\right).$$

If PEs have the same capacity rating, then the capacity loss becomes max(0, (N o-(N-k) e) c). Normalizing with the purchased capacity level of the system $C_p$ to obtain the capacity loss weight vector $w=[w_k]_{(N+1)\times 1}$, where $w_k$ is the capacity loss weight factor when there is a failure of k PEs, $$w_k = \frac{\max(0, (N o - (N-k)e)c)}{ocN} = \max\left(0, 1 - \frac{e}{o}\left(1 - \frac{k}{N}\right)\right) \tag{9}$$

Figure 16:
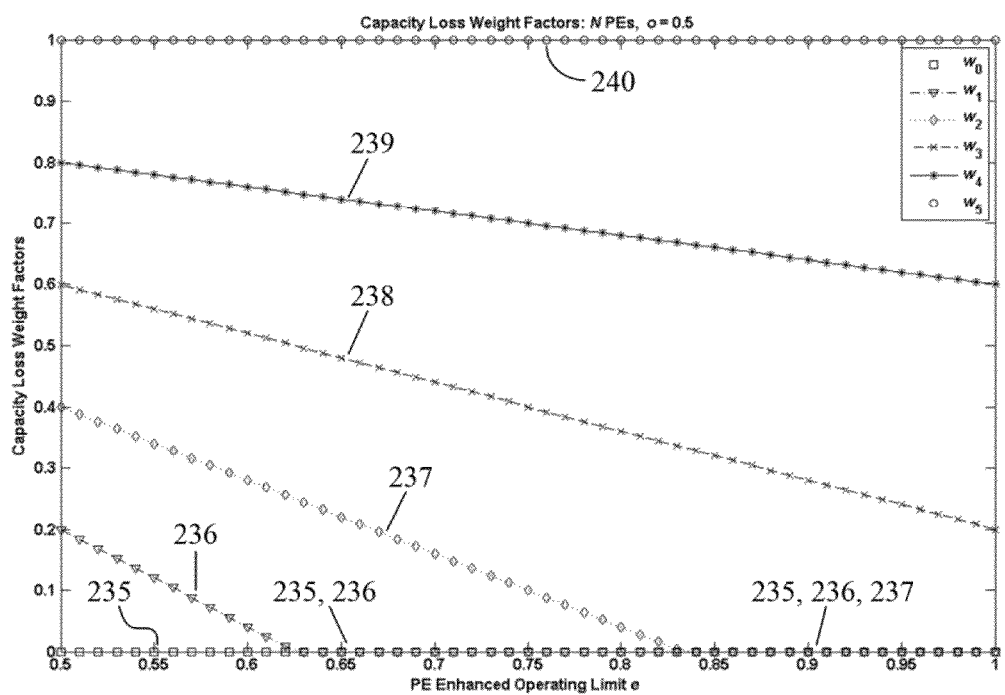
FIG. 16 shows exemplary plots of capacity loss weight factors against a PE's enhanced operating limit "e"

Notice that since $$e \geq o, \frac{e}{o} \geq 1,$$

and therefore the loss of capacity is less than $$\frac{k}{N}$$

of the total system purchased capacity ($C_p$). Also when k PEs fail and there is no spare capacity (i.e., e=o), the capacity loss is $$\frac{k}{N}$$

of the total system purchased capacity. FIG. 16 shows exemplary plots 235-240 of capacity loss weight factors against a PE's enhanced operating limit "e." In FIG. 16, the capacity loss weight factors are shown for a distributed PEs system with 5 PEs (i.e., N=5) and o=0.5. The capacity loss weight factors in FIG. 16 are indicated as $w_0$ (when there is no PE failure), $w_1$ (when one PE fails), . . . , and $w_5$ (when all PEs fail), and corresponding plots are identified by reference numerals 235, 236, . . . , and 240. It is noted with reference to FIG. 16 that, as e increases above the operating limit o=0.5, the system spare capacity level increases and, hence, capacity loss decreases.

With the state probability vector, p, and the capacity loss weight vector, w, the system unavailability may be easily calculated as the dot product $$w^T p = \sum_{j=0}^{N} w_j p_j \tag{10}$$

and the system availability may be given by $$a_{system} = 1 - w^T p = 1 - \sum_{j=0}^{N} w_j p_j \tag{11}$$

Also, the system downtime minutes per system per observed duration T, $D_{system,T}$, may be given by $$D_{system,T} = (1 - a_{system})T = \left(\sum_{j=0}^{N} w_j p_j\right) T \tag{12}$$

Thus, for example, when the observed duration or given time period T=1 year, the system downtime minutes per system per year, i.e., $D_{system,1yr}$, is just the system unavailability multiplied by the total number of minutes in 1 year. In other words, $$D_{system,1yr} = (1 - a_{system})(365.25 \times 24 \times 60) \tag{13}$$

$$= \left(\sum_{j=0}^{N} w_j p_j\right)(365.25 \times 24 \times 60)$$

In "TL 9000 Quality Management System (QMS) Measurements Handbook Release 4.5", Jul. 1, 2010, only capacity loss greater than 10% of the system purchased capacity, $C_p$, with an outage duration longer than 15 seconds is considered to be an outage. In order to account for this TL 9000 standard requirement in the present analysis, let the QMS capacity loss correction vector be $I=[I_k]_{(N+1)\times 1}$ where $$l_k = \begin{cases} 0, & \text{if } w_k \leq 0.1 \text{ or } \frac{1}{\mu} < 15 \text{ seconds} \\ 1, & \text{otherwise} \end{cases} \tag{14}$$

The TL9000 QMS system availability may be then given by:

$$a_{system_{QMS}} = 1 - \sum_{j=0}^{N} w_j l_j p_j \tag{15}$$

And, the TL 9000 system downtime minutes per system per year may be given by:

$$D_{system_{QMS}} = (1 - a_{system_{QMS}})(365.25 \times 24 \times 60) \tag{16}$$

$$= \left(\sum_{j=0}^{N} w_j l_j p_j\right)(365.25 \times 24 \times 60)$$

From the foregoing discussion, it is observed that if the PE downtime statistic is known to be $D_{PE,T}$ minutes/PE/T $$\left(\text{or equivalently, the PE availability, } a_{PE} = \frac{T - D_{PE}}{T}\right),$$

then the above-discussed reliability model for fractional PE capacity sparing may be used to derive the system downtime and system availability at any given purchased capacity operating level, o, and the enhanced operating limit e (these parameters are shown in FIG. 6 for reference). As mentioned earlier, to calculate $a_{system}$ and $D_{system,T}$ from $D_{PE,T}$, the methodology in FIG. 13 may be used. On the other hand, to calculate $a_{system}$ and $D_{system,T}$ from $a_{PE}$, the methodology in FIG. 14 may be used.

Referring again to FIGS. 13-14, after computing $a_{PE}$ from $D_{PE,T}$ (block 213, FIG. 13) or $D_{PE,T}$ from $a_{PE}$ (block 223, FIG. 13), the $D_{PE,T}$ may be used as normalized mean recovery time (or Mean Time To Recovery (MTTR) per observed duration T), i.e., the normalized recovery rate $$\mu_T = \frac{1}{D_{PE,T}},$$

to compute normalized failure rate ($\lambda_T$) for the system (per observed duration T) as given below:

$$\lambda_T = \frac{\mu_T(1 - a_{PE})}{a_{PE}}. \tag{17}$$

The above equation (17) represents the N=1 (i.e., a single PE) case in the context of FIG. 15. This computation is illustrated at blocks 214 and 224 in FIGS. 13 and 14, respectively. Thereafter, at blocks 215 and 225 in FIGS. 13 and 14, respectively, the normalized recovery rate $\mu_T$ and the normalized failure rate $\lambda_T$ may be used for the Markov model in FIG. 15 to compute the probability state vector $p=[p_0, p_1, \ldots, p_N]^T$ using equations (5) and (6) presented hereinbefore. At blocks 216 and 226 in FIGS. 13 and 14, respectively, the purchased (operating) capacity level o and the enhanced operating limit e may be used as inputs to compute the capacity loss vector $w=[w_0, w_1, \ldots, w_N]^T$ using equation (9) given hereinbefore. Finally, at blocks 217 and 227 in FIGS. 13 and 14, respectively, the system availability ($a_{system}$) may be computed using equation (11) and the system downtime ($D_{system,T}$) may be computed using equation (12) provided hereinbefore. Thus, using either of the methodologies in FIG. 13 or 14, the ISLM 72 may determine system availability and/or system downtime from an individual PE's reliability information (i.e., PE downtime or PE availability data).

As discussed earlier, to enable the integrated capacity and reliability SLA software licensing according to the teachings of the present invention, it may be desirable to be able to derive the minimum (or optimal) enhanced operating limit e* required to achieve the target system downtime $D_{system,T}^{(SLA)}$ (or target system availability $a_{system}^{(SLA)}$), under the constraints of the purchased capacity operating level, o, and the PE downtime statistic $D_{PE,T}$ (or PE availability $a_{PE}$). FIGS. 10 and 11 (along with FIGS. 13 and 14) provide a methodology to compute e* according to one embodiment of the present invention as discussed earlier.

Figure 17:
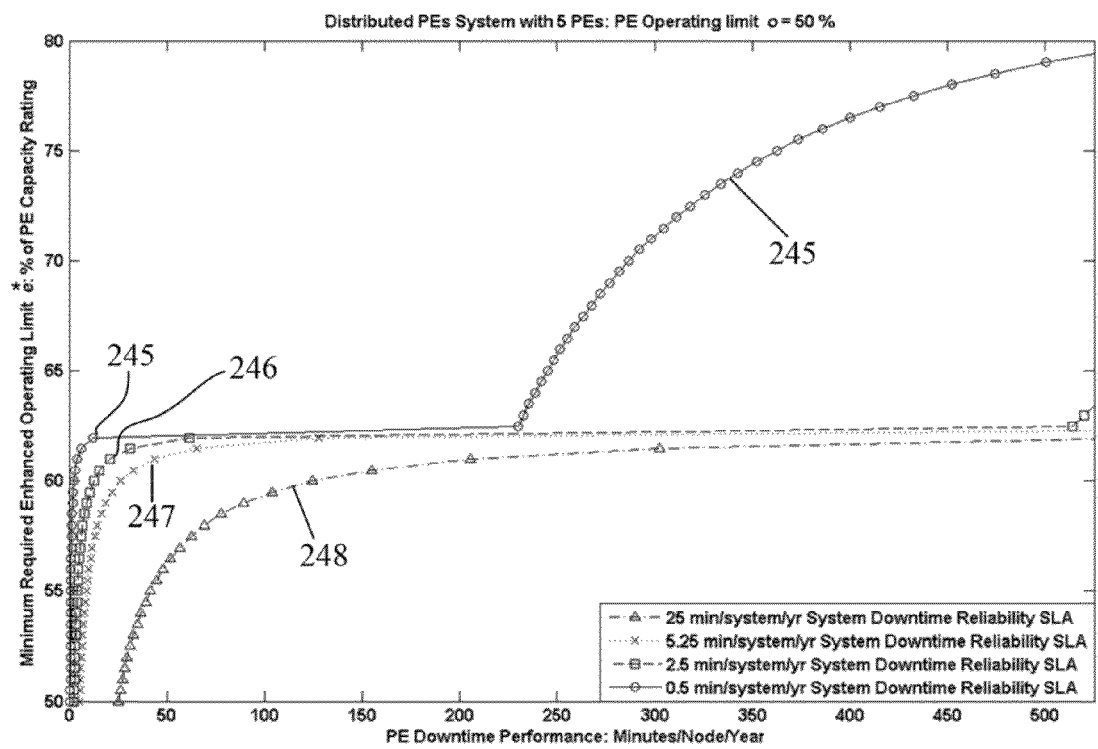
FIG. 17 illustrates an example of an application of the methodologies in FIGS. 11 and 12 to determine the optimal enhanced operating level e* according to one embodiment of the present invention.

FIG. 17 illustrates an example of an application of the methodologies in FIGS. 11 and 12 to determine the optimal enhanced operating level e* according to one embodiment of the present invention. The plots 245-248 in FIG. 17 depict e* (as a percentage of PE capacity rating c (assuming each PE having equal capacity)) for a distributed PEs system with 5 PEs and the purchased operating capacity $C_p = oC_{system} = 0.5 C_{system}$ (i.e., PE operating limit o=50%). In FIG. 17, plot 245 represents user-requested system downtime reliability SLA ($D_{system,T}^{(SLA)}$) of 0.525 min/system/year, plot 246 represents system downtime reliability SLA of 2.5 minutes/system/year, plot 247 represents system downtime reliability SLA of 5.25 minutes/system/year, and plot 248 represents system downtime reliability SLA of 25 minutes/system/year. In FIG. 17, e* is plotted over a wide range of PE downtime performance rating $D_{PE,T}$ (in minutes/node/year) or availability rating $a_{PE}$—from 3 9's (99.90%) PE availability $a_{PE}$ (i.e., 525 (≈500) minutes/node/year downtime $D_{PE,T}$) to 6 9's (99.9999%) PE availability $a_{PE}$ (i.e., 0.525 minute/node/year downtime $D_{PE,T}$).

FIG. 18 depicts three exemplary configurations (A), (B), and (C) (identified by reference numerals 250, 260, 270) showing how an Integrated capacity and reliability SLA Software License Controller (ISLC) according to the teachings of the present invention may be implemented. As mentioned earlier with reference to discussion of FIG. 4, two or more component resources (e.g., PEs) in the processing resource 74 may be connected to each other via a communication network (e.g., a network operated, managed, or used by an owner/operator of the component resources). In configuration-A 250 in FIG. 18, a distributed PEs system is shown to include N PEs (four of which are identified by reference numerals 252, 253, 254, and 255) coupled to a network 256 (which may provide a common, shared platform for system-wide service and administration issues). Similarly, in configuration-B 260, a distributed PEs system is shown to include N PEs (three of which are identified by reference numerals 262-264) coupled to a network 265. For example, either of the network 256, 265 may be a CN pool network and each PE 252-255 or 262-264 may be a CN node (e.g., an MSC or an SGSN). In one embodiment, one or more of the networks 256, 265 may include an Internet Protocol (IP) network (e.g., a portion of the Internet).

The ISLC may reside within or outside (e.g., on an Operation Administration and Maintenance (OA&M) platform) a distributed PEs system. In one embodiment, for reliability reason, there may be one or more redundant copies of the ISLC residing within the same or on different computing platform(s) where the ISLC state variables of the primary and the redundant controllers are synchronized periodically. In configuration 250, two redundant copies of an ISLC—i.e., ISLC 258A and ISLC 258B—are shown to reside within the system on two different PEs 252 and 254. On the other hand, in configuration 260, a single ISLC 267 is shown to reside outside the distributed PEs system.

In FIG. 18, the configuration-C 270 depicts a VM-based cloud 272 (e.g., a telco cloud) having a plurality of VM-based PEs—two of which are identified as node-i 274 and node-j 275. In configuration 270, each node is shown to be individually coupled to a respective ISLC 277, 278 residing outside the cloud 272. Although not shown, the ISLCs 277, 278 may be in communication with each other to maintain their states and system-wide ISL licensing data synchronized so as to carry out seamless management of ISL licenses assigned to the cloud 272 (e.g., by an ISL Manager (not shown in FIG. 18)). It is noted here that the configurations 250, 260, and 270 in FIG. 18 are for illustrative purpose only. Many other configurations (not shown) implementing an ISLC according to the teachings of the present invention may be devised as per system requirements and design considerations.

FIG. 19 shows an exemplary ISL Controller (e.g., the ISLC 77 shown in FIG. 4) according to one embodiment of the present invention. The ISLC 77 in FIGS. 4 and 19 may be representative of any of the ISLCs 258, 267, 277, and 278 in FIG. 18. As illustrated in FIGS. 4 and 18, the ISLC 77 may be coupled to its respective ISLM 72 and processing resource 74. As mentioned with reference to FIG. 3, an ISLC (e.g., the ISLC 77) according to one embodiment of the present invention may regularly monitor and police the capacity usage (of the corresponding processing resource 74) to ensure conformance with the purchased capacity level under normal operating condition so that precise level of spare capacity (e.g., as determined by the ISLM 72 as discussed hereinbefore) needed to meet the user-ordered reliability SLA can be accessed in the event of PE(s)/VM(s) outage. Like ISLM 72, the ISL Controller functionality may be implemented in hardware, software, or a combination of both. In one embodiment, the ISLC 77 may be a data processing or computing unit (e.g., a general purpose computer or PC, a workstation, a server, etc., which, in one embodiment, may be a part of the processing resource 74) having ISL license monitoring and controlling functionality. In that case, a CPU 280 (or, simply, a "processor") in the ISLC 77 may execute an ISL license monitoring/controlling application (software or program code) to enable the ISLC 77 to provide, for example, ISL license monitoring and capacity usage policing functionalities. The processor 280 may also perform the ISL license monitoring-related methodology discussed below with reference to the flowchart in FIG. 20. In one embodiment, functionalities of both the ISLM 72 and the ISLC 77 may be implemented in a single data processing or computing unit.

The ISLC 77 may also include a computer-readable data storage medium (also interchangeably referred to herein as "memory" or "database") 282 containing program code (not shown) for ISL license monitoring functionality, which program code may also include program code to perform various tasks managed by a system Monitoring and Policing Unit (MPU) 284 (discussed later) in the ISLC 77 and program code to facilitate performance of steps illustrated in the flowchart in FIG. 20. The processor 280 may execute instructions (or program code) stored in the database 282 to perform the monitoring and policing tasks 286-289 (discussed later) as well as the more-detailed steps in the flowchart in FIG. 20. The database 282 may also provide necessary data storage and retrieval during various stages of data processing being performed by the CPU 280. The data that may be stored in the database 282 include, for example, ISL license activation and deployment data 292 (representing activation/deployment information for ISL licenses allocated by the ISLM 72), PEs/VMs capacity usage data 293 (representing capacity usage data of each individual PE/VM in the distributed PEs systems/clouds coupled to the ISLC 77), PEs/VMs health status data 294 (representing health status (e.g., active, inactive due to failure, inactive but not failed, etc.) of each individual PE/VM in various distributed PEs systems/clouds coupled to the ISL Controller 77), and ISLC state variables 295 that may be needed, for example, to perform state synchronization between two or more redundant ISL controllers (if implemented) in the system.

The processor 280 may include, by way of example, a general purpose processor, a special purpose processor, a conventional processor, a Digital Signal Processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor 280 may employ distributed processing in certain embodiments.

As mentioned before, the ISL controller functionality may be implemented in a computer program, software, or firmware incorporated in a computer-readable storage medium (e.g., the memory 282) for execution by a general purpose computer or a processor (e.g., the CPU 280). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the database 282 may employ distributed data storage with/without redundancy.

The MPU 284 in the ISLC 77 may perform various tasks (using the CPU 280 as mentioned earlier) such as, for example, monitoring of capacity usage of each PE (or VM-based processing entity) in the system (task 286), monitoring of health status of each PE (or VM-based processing entity) in the system (task 287), policing of user-ordered system reliability SLA (task 288) and related policing of system capacity usage (task 289). The MPU 284 may also perform one or more tasks shown in the flowchart in FIG. 20 as part of ISLC's ISL license monitoring and policing functionality.

It is noted here that additional architectural details of the ISLC 77 are not shown in FIG. 19 merely for the sake of simplicity. Thus, for example, input/output (I/O) devices (e.g., a computer keyboard, a touch-screen, a computer display monitor, a computer mouse, etc.) attached to or associated with the ISLC 77 are not shown in FIG. 19. Similarly, additional external devices (e.g., network administration systems, network controller, an ISLM, etc.) that may interact with the ISLC 77 or that may receive communications from the ISLC 77 are also not illustrated in FIG. 19 for the sake of simplicity. However, it is understood that various I/O and other external devices/systems may be used in conjunction with the ISLC 77 to accomplish various ISL license implementation and control functions, e.g., to report capacity usage violation to appropriate entity (e.g., a human operator, or a network controller), to display results of ISL license monitoring and policing actions, to provide ISLM with the most current usage and health status of PEs in the system to assist ISLM in granting/denying ISL license orders from users, etc.

Figure 20:
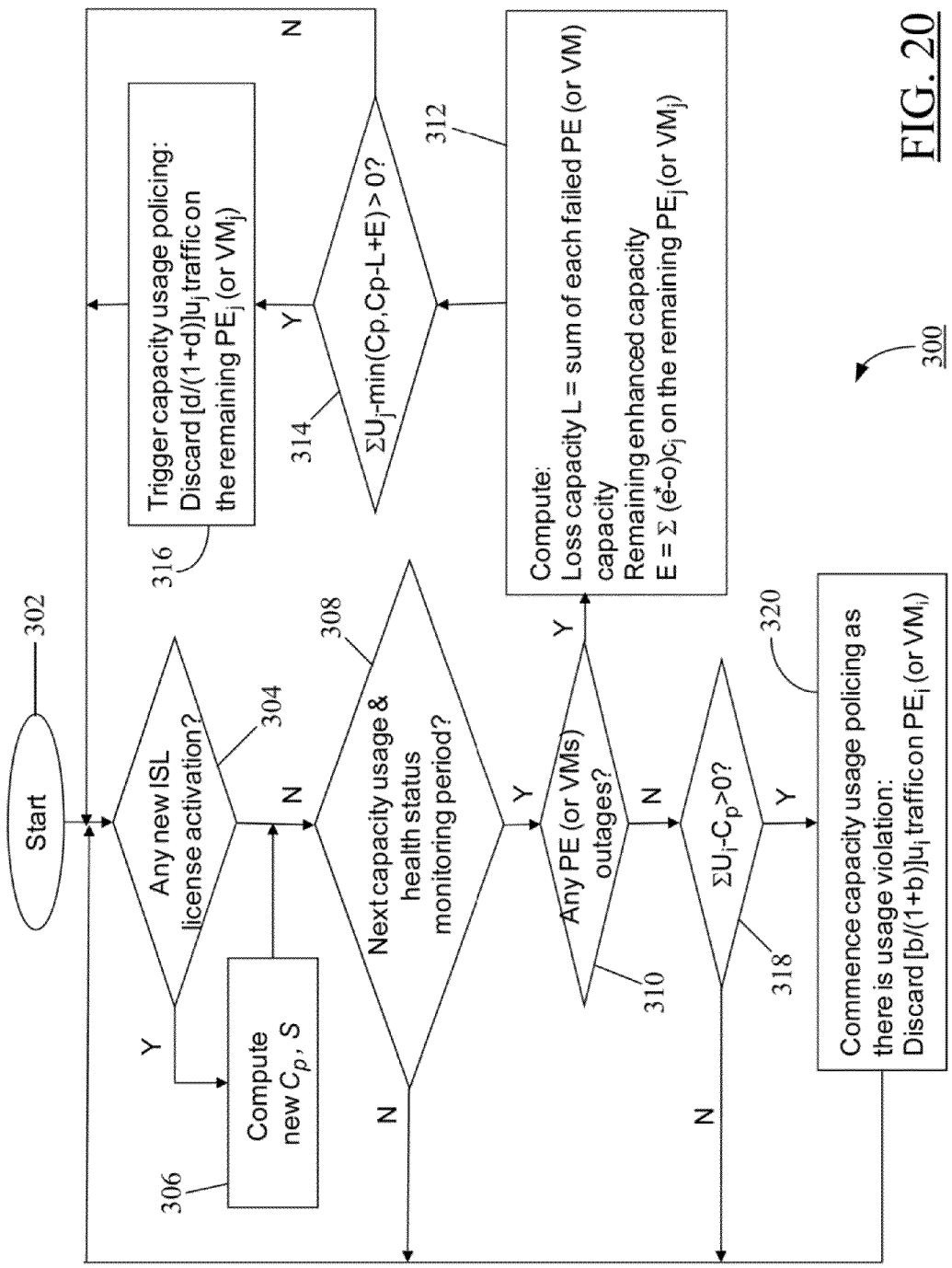
FIG. 20 illustrates an exemplary flowchart depicting functionality of an ISL Controller according to one embodiment of the present invention.

FIG. 20 illustrates an exemplary flowchart 300 depicting functionality of an ISL Controller (e.g., the ISLC 77 in FIG. 19) according to one embodiment of the present invention. The ISLC 77 may initially check if any new (or upgraded) ISL software licenses have been activated by the ISLM 72 (blocks 302, 304). If there are newly deployed ISL software licenses, the ISLC 77 may compute the new purchased operating capacity $C_p = oC_{system}$ and may also optionally compute the enhanced (spare) capacity $S = (e^* - o)C_{system}$. In one embodiment, as part of this calculation, ISLC 77 may receive values of o and $e^*$ from ISLM 72 (which receives value of o through a customer's order and determines $e^*$ as discussed earlier), whereas it may have information about the system capacity $C_{system}$ stored in its database 282. At the next (system) capacity utilization measurement and PEs/VMs health status update time instant (block 308), if there is any PE or VM outage (block 310), then ISLC 77 may perform the tasks at blocks 312, 314, and 316; otherwise, ISLC 77 may continue the tasks at blocks 318 and 320 as shown in FIG. 20. At block 312, the ISLC 77 may compute the loss capacity L and the remaining capacity E. If k PEs, k=1, 2, ..., N fail, then the capacity loss from the outages is $L = {}^o\Sigma_{k\,failed\,PEs}\,c_k$ (wherein each of the k failed PEs has capacity $c_k$). The remaining spare capacity is $E = {}^{(e-o)}\Sigma_{N-k\,active\,PEs}\,c_j$. Here, capacity of each of the j=N–k remaining PEs is represented by $c_j$ merely to distinguish failed PEs from the remaining PEs. In one embodiment, as discussed earlier, each PE (whether failed or active) may have the same capacity rating c. Furthermore, some of the k PEs may partially fail, in which case their remaining (active) capacity also may be taken into account in determining E. Alternatively, such partially failed PEs may be treated as completely failed PEs and, hence, they may not be considered as "active" in determining E and their workload may be suitably distributed among remaining (fully-active) PEs as discussed below.

The ISLC 77 may then check to see if the (current) capacity usage level of the system (of active PEs) exceeds the remaining purchased capacity and the remaining spare capacity, by checking at block 314 whether $\Sigma_j u_j > \min(C_p, C_p - L + E)$, where $u_j$ represents the current value of the smoothed (e.g., using moving average) capacity utilization at each individual active $PE_j/VM_j$. If $\Sigma_j u_j > \min(C_p, C_p - L + E)$, then ISLC 77 may trigger license enforcement action (block 316) on each active $PE_j/VM_j$ proportionately to the $PE_j$'s/$VM_j$'s normalized carried workload level of $$\frac{u_j}{\sum_j u_j}.$$

In other words, ISLC 77 may take enforcement action (i.e., capacity usage policing) on the workload amount of $$\frac{u_j}{\sum_j u_j}\left(\sum_j u_j - \min(C_p, C_p - L + E)\right)$$

at each of the remaining $PE_j/VM_j$ to ensure a coordinated enforcement action across all the PEs/VMs in the system. In this case, each remaining $PE_j/VM_j$ may be forced (e.g., by ISLC 77) to discard the workload in the amount of $$\frac{d}{1+d}u_j$$

for some d>0 (block 316 in FIG. 20). Thus, each remaining PE can just discard the same proportionate amount of workload in order to bring the total system capacity usage under the purchased capacity $C_p$ and to also accommodate workload that may be re-routed from failed PEs. Additional discussion of workload discarding is also provided below with reference to discussion of block 320.

If there is no PEs/VMs outage, then at block 318 ISLC 77 may determine if the (current) capacity usage level of the system exceeds the purchased capacity ($C_p$) by checking whether $\Sigma_i u_i > C_p$, where $i=1, 2, \ldots, N$ and $u_i$ represents the current value of the smoothed capacity utilization (i.e., capacity utilization measurement) at each individual $PE_i/VM_i$ in the system (having a total of N PEs/VMs). If $\Sigma_i u_i > C_p$, the ISLC 77 may trigger license enforcement action (i.e., capacity usage policing at block 320) on each $PE_i/VM_i$ proportionately to the $PE_i$'s/$VM_i$'s normalized carried workload level of $$\frac{u_i}{\sum_i u_i}.$$

In other words, ISLC 77 may take enforcement action on the workload amount of $$\frac{u_i}{\sum_i u_i}\left(\sum_i u_i - C_p\right)$$

at each $PE_i/VM_i$ in the system to ensure a coordinated enforcement action across all the PEs/VMs in the system. The process in the flowchart 300 may repeat starting with block 304 as illustrated.

In case of $\Sigma_i u_i > C_p$ (i.e., if the aggregate capacity usage of all PEs/VMs in the system exceeds $C_p$), then $\Sigma_i u_i = (1+b)C_p$ for some b>0, or $$C_p = \frac{\sum_i u_i}{1+b}.$$

Therefore, the system may need to discard the workload in the amount of $$\sum_i u_i - C_p = \sum_i u_i - \frac{\sum_i u_i}{1+b} \quad (18)$$

$$= \left(1 - \frac{1}{1+b}\right)\sum_i u_i$$

$$= g\sum_i u_i$$

$$= \sum_i g u_i$$

where $$g = 1 - \frac{1}{1+b} = \frac{b}{1+b}.$$

That is, each $PE_i/VM_i$ may be forced (e.g., by ISLC 77) to discard the same proportionate amount of workload $gu_i$ (i.e., $$\left(\text{i.e., } \frac{b}{1+b}u_i\right)$$

(block 320 in FIG. 20) in order to bring the total system capacity usage under the purchased capacity $C_p$. The calculations at equation (18) may equally apply at block 316 by replacing "b" with "d" and "$u_i$" with "$u_j$" as may be evident to one skilled in the art. It is noted here that the values of "b" and "d" (in the flowchart 300 in FIG. 20) that may be needed as part of ISLC's 77 control of the workload may be implementation-specific, and may be dynamically determined and automatically changed over time during the operation. Similarly, ISLC's 77 enforcement action also may be implementation-specific. For example, as part of its enforcement action, ISLC 77 may display enforcement messages on an operator's display unit. In another embodiment, ISLC 77 may continue to reject future workload requests as part of its enforcement action until capacity usage is under predetermined level. In any event, it is observed here that because ISLC 77 may be able to keep track of the capacity usage at the system level, instead of at the PE level, it can guarantee access to the spare capacity at the system level to facilitate implementation/deployment of ISL licenses granted by the ISLM 72.

It is again noted here that, as mentioned earlier, although various flowcharts and diagrams are discussed herein primarily with reference to a distributed PEs system, the entire discussion is equally applicable to any other component resource-based entity (e.g., a VM-based cloud, or any other processing resource).

The foregoing describes a system and method for providing on-demand Integrated capacity and reliability SLA Software License (ISL). The disclosed approach enables the on-demand scaling of system capacity together with the desired reliability SLA (e.g., in terms of system downtime SLA or system availability SLA) according to need at fine granularity of both quantities, thereby allowing customized purchase of capacity together with the desired reliability SLA at fine granularity of both quantities. The ISL licensing approach according to the present invention can be applied in the distributed PEs systems, such as the MSC pool or SGSN/MME pool systems that have the capability to provide spare capacity at the system level. It can also be applied in the cloud computing model (e.g., a telco cloud) where redundant or spare capacity can be engineered utilizing the virtualization technology to support the many-to-one failover of the VMs in a virtual environment in the cloud. The on-demand ISL licensing approach according to the present invention makes use of an ISL dimensioning methodology (implemented using an ISL Manager) and an ISL Controller (ISLC) that keeps track of the capacity usage at the system level together with the periodic monitoring of health status of PEs or VMs.

The ISLC dynamically controls the capacity usage as well as the reliability SLA based on the aggregated workload utilization conditions from all the PEs or VMs, hence allowing appropriate level of workload to be (re-)routed to other PEs or VMs whenever there are partial or total outages of individual PE(s) or VM(s). The total amount of re-routed workload due to outages may be further policed by the ISLC at an optimal level to allow the delivery of the user-purchased level of guaranteed reliability SLA in an economical manner.

The present invention thus enables the cloud providers to offer differentiated reliability SLA for different cloud users. For example, in a managed telco cloud, such an opportunity opens the possibility for hosting multiple carrier service providers running some or all of their network equipments in the same cloud while allowing for different on-demand scalable reliability SLAs for different service providers in addition to the on-demand scalable capacity. Also, different application nodes (e.g., MSC, SGSN, etc.) in the same cloud can have different reliability SLAs as well as the ability to independently scale their reliability SLAs.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of providing an Integrated capacity and reliability Service Level Agreement (SLA) Software License (ISL), the method comprising the steps of:
    using an ISL manager, receiving an order from a user for a user-requested level of capacity and a user-requested level of reliability SLA for a processing resource that is shared among a plurality of users, wherein both the capacity and the reliability SLA are configured to be on-demand and scalable by each user in the plurality of users; and
    using the ISL manager, providing the ISL for the user-requested level of capacity and the user-requested level of reliability SLA for the processing resource by:
        determining the number of capacity software licenses needed for the user-requested capacity and a minimum operating capacity of the processing resource required to deliver the user-requested reliability SLA at the user-requested level of capacity, wherein the minimum operating capacity comprises an average of the maximum spare capacity at the component resource and the user-requested level of capacity; and
        allocating the ISL to the order when the processing resource has at least the minimum operating capacity to support the determined number of capacity software licenses.

2. The method of claim 1, further comprising:
    using the ISL manager, determining whether the processing resource is able to support the determined number of capacity software licenses and the minimum operating capacity.

3. The method of claim 1, further comprising performing at least one of the following using the ISL manager when the processing resource is unable to support the determined number of capacity software licenses and the minimum operating capacity:
    computing the best capacity and reliability SLA level supportable by the processing resource;
    offering a partial ISL to the user for the capacity and reliability SLA level supported by the processing resource;
    displaying a warning related to an option available to enable the processing resource to support the determined number of capacity software licenses and the minimum operating capacity; and
    rejecting the order and issuing a log entry showing the best capacity and reliability SLA level supportable by the processing resource.

4. The method of claim 1, wherein the processing resource includes a plurality of component resources, and wherein the step of determining the number of capacity software licenses and the minimum operating capacity includes querying a database associated with the ISL manager for at least one of the following data:
    data related to current configuration of the processing resource;
    data related to capacity of one of the plurality of component resources; and
    data related to reliability performance of said one of the plurality of component resources.

5. The method of claim 1, wherein the user-requested level of reliability SLA includes one of the following:
    user-requested downtime SLA for the processing resource for a predetermined duration; and
    user-requested availability SLA for the processing resource.

6. The method of claim 5, wherein the processing resource includes a plurality of component resources, and wherein the step of determining the number of capacity software licenses and the minimum operating capacity includes the following when the user-requested reliability SLA is the user-requested downtime SLA:
    deriving a first value for the predetermined duration-specific downtime of the processing resource using the following:
        a downtime performance rating of a component resource from the plurality of component resources for the predetermined duration,
        a first spare capacity value,
        the user-requested level of capacity, and
        the total number of component resources in the plurality of component resources;
    deriving a second value for the predetermined duration-specific downtime of the processing resource using the following:
        the downtime performance rating of the component resource for the predetermined duration,
        a second spare capacity value,
        the user-requested level of capacity, and
        the total number of component resources in the plurality of component resources;
    deriving a third value for the predetermined duration-specific downtime of the processing resource using the following:
        the downtime performance rating of the component resource for the predetermined duration,
        a third spare capacity value, wherein the third spare capacity value is an average of the first and the second spare capacity values,
        the user-requested level of capacity, and
        the total number of component resources in the plurality of component resources; and
    comparing each of the first, the second, and the third values for the predetermined duration-specific downtime of the processing resource against the user-requested downtime SLA to determine the minimum operating capacity.

7. The method of claim 5, wherein the processing resource includes a plurality of component resources, and wherein the step of determining the number of capacity software licenses and the minimum operating capacity includes the following when the user-requested reliability SLA is the user-requested availability SLA:
    deriving a first value for availability of the processing resource using the following:
        an availability rating of a component resource from the plurality of component resources,
        a predetermined time duration,
        a first spare capacity value,
        the user-requested level of capacity, and
        the total number of component resources in the plurality of component resources;
    deriving a second value for the availability of the processing resource using the following:
        the availability rating of the component resource,
        the predetermined duration,
        a second spare capacity value,
        the user-requested level of capacity, and
        the total number of component resources in the plurality of component resources;
    deriving a third value for the availability of the processing resource using the following:
        the availability rating of the component resource,
        the predetermined duration,
        a third spare capacity value, wherein the third spare capacity value is an average of the first and the second spare capacity values,
        the user-requested level of capacity, and
        the total number of component resources in the plurality of component resources; and
    comparing each of the first, the second, and the third values for the availability of the processing resource against the user-requested availability SLA to determine the minimum operating capacity.

8. The method of claim 1, wherein the processing resource includes a plurality of component resources, and wherein the method further comprises:
    performing the following using an ISL controller in communication with the ISL manager:
        checking if the ISL manager has allocated the ISL to the order;
        if the ISL manager has allocated the ISL to the order, computing a purchased capacity of the processing resource by applying the user-requested level of capacity to the total capacity of the processing resource; and
    using the ISL controller, performing the following at the next capacity usage and health status monitoring period for the processing resource if there is no outage at any of the plurality of component resources:
        determining if the current capacity usage of the processing resource exceeds the purchased capacity of the processing resource, and
        upon determining that the current capacity usage exceeds the purchased capacity, triggering an ISL license enforcement action at each component resource in proportion to a corresponding normalized workload level at the component resource.

9. The method of claim 8, further comprising:
    using the ISL controller, performing the following at the next capacity usage and health status monitoring period for the processing resource if there is an outage at any of the plurality of component resources:
        computing a capacity loss at the processing resource in view of the outage;
        further computing remaining spare capacity at the processing resource in view of the outage; and
        triggering the ISL license enforcement action at each component resource without outage in proportion to a corresponding normalized workload level at the component resource without outage upon determining that the current capacity usage of the processing resource exceeds the smaller of the following two values:
            the purchased capacity of the processing resource, and
            the total of the purchased capacity and the remaining spare capacity reduced by the capacity loss.

10. The method of claim 1, wherein the processing resource includes a plurality of component resources, and wherein one of the following applies:
    the processing resource is a cloud computing entity and each of the plurality of component resources is a Virtual Machine (VM); and
    the processing resource is a distributed Processing Entities (PEs) system and each of the plurality of component resources is a PE.

11. A system for providing an Integrated capacity and reliability Service Level Agreement (SLA) Software License (ISL), the system comprising:
    an ISL Manager (ISLM) comprising a processor and a memory for storing an ISL license management application, wherein the processor executes the ISL license management application to:
        receive an order from a user for a user-requested level of capacity and a user-requested level of reliability SLA for a processing resource that is shared among a plurality of users, wherein both the capacity and the reliability SLA are configured to be on-demand and scalable by each user in the plurality of users, and
        provide the ISL for the user-requested level of capacity and the user-requested level of reliability SLA for the processing resource; and
    an ISL Controller (ISLC) coupled to the processing resource and in communication with the ISLM, the ISLC comprising a processor and a memory for storing an ISL license monitoring or controlling application, wherein the processor executes the application to monitor capacity usage of the processing resource to ensure that the user-requested level of capacity of the processing resource is available at the user-requested level of reliability SLA for the ISL provided by the ISLM, wherein the processor further executes the ISL license monitoring or controlling application to provide the ISL by performing the following:
        determining the number of capacity software licenses needed for the user-requested capacity and a minimum operating capacity of the processing resource required to deliver the user-requested reliability SLA at the user-requested level of capacity, wherein the minimum operating capacity comprises an average of the maximum spare capacity at the component resource and the user-requested level of capacity;
        further determining whether the processing resource is able to support the determined number of capacity software licenses and the minimum operating capacity; and
        allocating the ISL to the order when the processing resource has at least the minimum operating capacity to support the determined number of capacity software licenses.

12. The system of claim 11, wherein the processing resource includes a plurality of component resources, and wherein the ISLC is configured to further perform the following:
  check if the ISLM has allocated the ISL to the order;
  if the ISLM has allocated the ISL to the order, compute a purchased capacity of the processing resource;
  perform the following at the next capacity usage and health status monitoring period for the processing resource if there is no outage at any of the plurality of component resources:
    determine if the current capacity usage of the processing resource exceeds the purchased capacity of the processing resource, and
    upon determining that the current capacity usage exceeds the purchased capacity, trigger an ISL license enforcement action at each component resource in proportion to a corresponding normalized workload level at the component resource; and
  perform the following at the next capacity usage and health status monitoring period for the processing resource if there is an outage at any of the plurality of component resources:
    compute a capacity loss at the processing resource in view of the outage,
    further compute remaining spare capacity at the processing resource in view of the outage, and
    trigger the ISL license enforcement action at each component resource without outage in proportion to a corresponding normalized workload level at the component resource without outage upon determining that the current capacity usage of the processing resource exceeds the smaller of the following two values:
      the purchased capacity of the processing resource, and
      the total of the purchased capacity and the remaining spare capacity reduced by the capacity loss.

13. The system of claim 12, wherein the ISLC is configured to trigger the ISL license enforcement action by performing one of the following:
  if there is no outage at any of the plurality of component resources, trigger the ISL license enforcement action by discarding, at each component resource, a workload equal to a first dynamically-determined portion of the current capacity utilization of the component resource; and
  if there is outage at any of the plurality of component resources, trigger the ISL license enforcement action by discarding, at each component resource without outage, a workload equal to a second dynamically-determined portion of the current capacity utilization of the component resource without outage.

14. The system of claim 11, further comprising:
  the processing resource having a plurality of component resources, wherein one of the following applies:
    the processing resource is a cloud computing entity and each of the plurality of component resources is a Virtual Machine (VM); and
    the processing resource is a distributed Processing Entities (PEs) system and each of the plurality of component resources is a PE.

15. A method of granting and managing an Integrated capacity and reliability Service Level Agreement (SLA) Software License (ISL), the method comprising the steps of:
  using an ISL manager, receiving an order from a user for a user-requested level of capacity and a user-requested level of reliability SLA for a processing resource that is shared among a plurality of users, wherein both the capacity and the reliability SLA are configured to be on-demand and scalable by each user in the plurality of users;
  using the ISL manager, determining the number of capacity software licenses needed for the user-requested capacity and a minimum operating capacity of the processing resource required to deliver the user-requested reliability SLA at the user-requested level of capacity, wherein the minimum operating capacity comprises an average of the maximum spare capacity at the component resource and the user-requested level of capacity;
  using the ISL manager, allocating the ISL to the order when the processing resource has at least the minimum operating capacity to support the determined number of capacity software licenses; and
  using an ISL controller coupled to the processing resource and in communication with the ISL manager, monitoring capacity usage of the processing resource to ensure that the user-requested level of capacity of the processing resource is available at the user-requested level of reliability SLA for the ISL allocated by the ISL manager.

16. The method of claim 15, further comprising performing at least one of the following using the ISL manager when the processing resource is unable to support the determined number of capacity software licenses and the minimum operating capacity:
  computing the best capacity and reliability SLA level supportable by the processing resource;
  offering a partial ISL to the user for the capacity and reliability SLA level supported by the processing resource;
  displaying a warning related to an option available to enable the processing resource to support the determined number of capacity software licenses and the minimum operating capacity; and
  rejecting the order and issuing a log entry showing the best capacity and reliability SLA level supportable by the processing resource.

17. The method of claim 15, wherein the processing resource includes a plurality of component resources, and wherein the method further comprises performing one of the following using the ISL controller:
  if there is no outage at any of the plurality of component resources, enforcing the ISL across all of the plurality of component resources in proportion to a component resource-specific normalized workload level at each of the plurality of component resources; and
  if there is an outage at any of the plurality of component resources, enforcing the ISL across only those of the plurality of component resources which are unaffected by the outage and in proportion to the component resource-specific normalized workload level at each said component resource without outage.

18. A communication network node providing a processing resource that is shared among a plurality of users, wherein the communication network node includes a data processing unit configured to provide an Integrated capacity and reliability Service Level Agreement (SLA) Software License (ISL) by performing the following:
  receiving an order from a user for a user-requested level of capacity and a user-requested level of reliability SLA for the processing resource, wherein both the capacity and the reliability SLA are configured to be on-demand and scalable by each user in the plurality of users; and providing the ISL for the user-requested level of capacity and the user-requested level of reliability SLA for the processing resource, wherein providing the ISL comprises:
- determining the number of capacity software licenses needed for the user-requested capacity and a minimum operating capacity of the processing resource required to deliver the user-requested reliability SLA at the user-requested level of capacity, wherein the minimum operating capacity comprises an average of the maximum spare capacity at the component resource and the user-requested level of capacity; and
- allocating the ISL to the order when the processing resource has at least the minimum operating capacity to support the determined number of capacity software licenses.

19. The communication network node of claim 18, wherein the data processing unit is further configured to perform the following:
- monitoring capacity usage of the processing resource to ensure that the user-requested level of capacity of the processing resource is available at the user-requested level of reliability SLA for the ISL provided.

* * * * *